US012674860B2

(12) United States Patent
Reddy et al.

(10) Patent No.: US 12,674,860 B2
(45) Date of Patent: Jul. 7, 2026

(54) POSITION LOCATION USING ELECTRONIC SHELF LABEL (ESL) FINGERPRINTS

(71) Applicant: QUALCOMM Incorporated, San Diego, CA (US)

(72) Inventors: Varun Amar Reddy, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 279 days.

(21) Appl. No.: 18/531,526

(22) Filed: Dec. 6, 2023

(65) Prior Publication Data

US 2025/0189617 A1    Jun. 12, 2025

(51) Int. Cl.
*G01S 5/02*        (2010.01)
*G09F 3/20*        (2006.01)
*H04W 64/00*      (2009.01)

(52) U.S. Cl.
CPC ............ *G01S 5/0284* (2013.01); *G09F 3/208* (2013.01); *H04W 64/003* (2013.01)

(58) Field of Classification Search
CPC .... G01S 5/0284; G01S 5/0205; G01S 5/0215; G01S 5/0252; G09F 3/208; H04W 64/003; H04W 4/029; H04W 4/35; H04W 4/02
See application file for complete search history.

(56) References Cited

U.S. PATENT DOCUMENTS 7,844,774 B2 * 11/2010 Ellard ..................... G06F 16/90
                                                                      382/116
11,650,782 B2 * 5/2023 Hu .......................... G06F 3/147
                                                                      345/30
2022/0051310 A1    2/2022 Graube et al.

FOREIGN PATENT DOCUMENTS

CN              113573240 B        11/2022
WO      WO-2022040113 A1      2/2022

OTHER PUBLICATIONS

International Search Report and Written Opinion—PCT/US2024/053532—ISA/EPO—Feb. 3, 2025.

* cited by examiner

*Primary Examiner* — Kabir A Timory
(74) *Attorney, Agent, or Firm* — Norton Rose Fulbright US LLP

(57)                ABSTRACT

This disclosure provides systems, methods, and devices for Electronic Shelf Label (ESL) systems that support indoor positioning of target devices. In a first aspect, a method includes: receiving, from a target device, signal measurements of at least a first subset of ESL nodes in a vicinity of the target device; identifying at least one ESL node of the ESL nodes which satisfy a criterion based on the signal measurements; and determining a position of the target device based on a subset of locations including the locations associated with the at least one ESL node. Other aspects and features are also claimed and described.

30 Claims, 8 Drawing Sheets

700

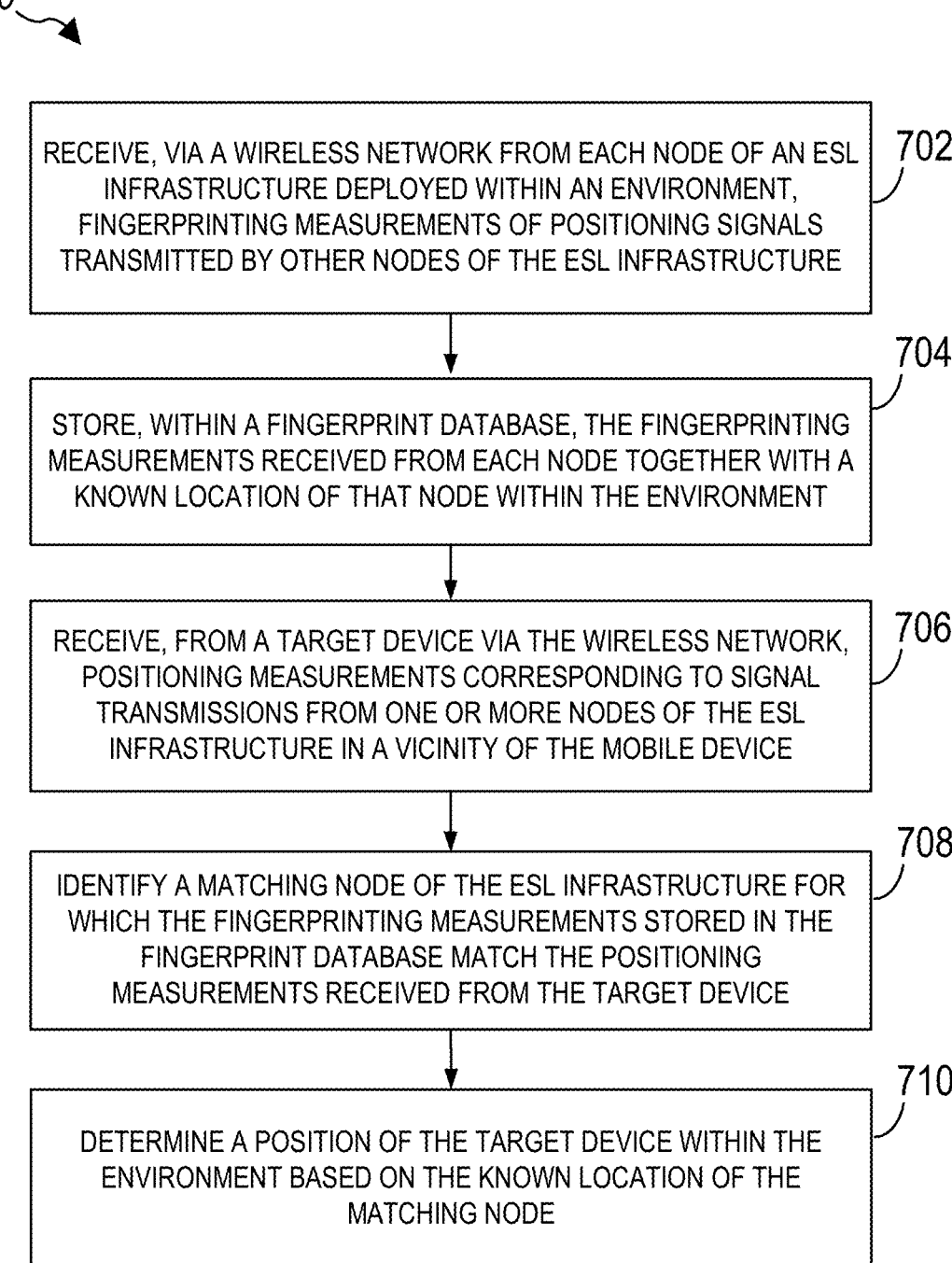

RECEIVE, VIA A WIRELESS NETWORK FROM EACH NODE OF AN ESL INFRASTRUCTURE DEPLOYED WITHIN AN ENVIRONMENT, FINGERPRINTING MEASUREMENTS OF POSITIONING SIGNALS TRANSMITTED BY OTHER NODES OF THE ESL INFRASTRUCTURE

702

STORE, WITHIN A FINGERPRINT DATABASE, THE FINGERPRINTING MEASUREMENTS RECEIVED FROM EACH NODE TOGETHER WITH A KNOWN LOCATION OF THAT NODE WITHIN THE ENVIRONMENT

704

RECEIVE, FROM A TARGET DEVICE VIA THE WIRELESS NETWORK, POSITIONING MEASUREMENTS CORRESPONDING TO SIGNAL TRANSMISSIONS FROM ONE OR MORE NODES OF THE ESL INFRASTRUCTURE IN A VICINITY OF THE MOBILE DEVICE

706

IDENTIFY A MATCHING NODE OF THE ESL INFRASTRUCTURE FOR WHICH THE FINGERPRINTING MEASUREMENTS STORED IN THE FINGERPRINT DATABASE MATCH THE POSITIONING MEASUREMENTS RECEIVED FROM THE TARGET DEVICE

708

DETERMINE A POSITION OF THE TARGET DEVICE WITHIN THE ENVIRONMENT BASED ON THE KNOWN LOCATION OF THE MATCHING NODE

POSITION LOCATION USING ELECTRONIC SHELF LABEL (ESL) FINGERPRINTS

TECHNICAL FIELD

Aspects of the present disclosure relate generally to electronic shelf label (ESL) systems, and more particularly, to methods and systems for positioning of user devices in an indoor environment using an ESL system deployed within the environment.

INTRODUCTION

In general, retail stores use paper labels to display information about products displayed on shelves, such as prices, discount rates, unit costs, origins, or the like. Using such paper labels for the price display has limitations. For example, when there are changes in product information or locations on shelves, the retailer must generate new paper labels and discard old ones. This raises costs for maintenance in both supplies and employee labor. Further, in environmental terms, replacing the labels wastes raw materials such as paper, which adversely affects the protection of the environment. Still further, humans are prone to make mistakes, such as mislabeling a shelf or product or forgetting to take down temporary price changes on certain shelving, which results in shopper frustration.

Electronic shelf label (ESL) devices are electronic devices for displaying price or other relevant information for items on retail store shelves, which may be used in place of paper labels. ESL devices may be attached to a front edge of retail shelving and display a variety of information using display devices, such as Liquid Crystal Displays (LCD). Whenever the information about a product or the location of a product is changed, the ESL device may be programmed with new product information. Thus, the same electronic shelf label can be repeatedly used. The individual ESL devices or nodes of an ESL system may be equipped with Bluetooth Low Energy (BLE) radios that can be used to estimate a position of a BLE-enabled device based on the known locations of nearby ESL devices within an indoor environment, such as a retail environment associated with a retail store or distribution warehouse. Fingerprinting has been widely considered as a potential solution for position estimation in such environments. However, traditional fingerprinting techniques used for indoor positioning suffer from numerous drawbacks, including a lack of scalability and a lack of accuracy in the estimated position.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Electronic shelf label (ESL) devices of an ESL system deployed within an environment (such as a retail environment associated with a retail store or a distribution warehouse) may be used to provide different kinds of information and services to various users of the ESL system (such as shoppers or store workers). For example, ESL devices operating on a wireless network as part of the ESL system may support indoor positioning services to identify the respective locations of ESL devices within the environment (e.g., on shelves of gondolas located within a retail store). The ESL devices and other devices or components of the ESL system may represent different nodes of an infrastructure of the ESL system (or "ESL infrastructure"). As another example, the ESL system may support position location services to identify a position of a user (or user device) and/or other devices or objects within the environment.

As still another example, the ESL system may be used to provide positioning techniques for determining the position of a target device in the environment based on fingerprinting measurements of positioning signals exchanged between different nodes of the ESL infrastructure deployed at known locations within the environment. The target device may be, for example, a mobile device of a user (e.g., a retail store worker or customer) or a low-powered ambient device (e.g., an Internet of Things (IoT) tag placed on a product or other object) located within the environment. The nodes of the ESL infrastructure may include any various devices or components of the ESL system deployed within the environment. Examples of such infrastructure nodes include, but are not limited to, ESL devices, access points, one or more gateway nodes, and energizer devices used to supply power to other infrastructure nodes over a wired or wireless network. The fingerprinting measurements may be collected by each node of the ESL infrastructure based on the positioning signals transmitted by other nodes during one or more time periods. The set of measurements collected by each node may represent a "fingerprint" of that node's signal reception characteristics at a known location of that node within the environment relative to that of the other nodes at other known locations within the environment.

As will be described in further detail below, a server of the ESL system may store the fingerprint (or set of fingerprinting measurements) for each node together with the known location of that node in a fingerprint database. The fingerprint database may then be used by the server for purposes of positioning a target device within the environment. For example, the server may determine the position of the target device by matching positioning measurements received from the target device with the fingerprinting measurements stored in the fingerprint database for at least one node of the ESL infrastructure deployed at a known location within the environment. The position of the target device in this example may correspond to the known location of the at least one node for which the corresponding fingerprinting measurements stored in the fingerprint database match the positioning measurements received from the target device.

Example embodiments provide systems and methods for location fingerprinting using nodes of an ESL infrastructure deployed within an environment.

In one aspect of the disclosure, a method includes: receiving, from a target device by a server managing electronic shelf label (ESL) nodes, signal measurements of at least a first subset of ESL nodes in a vicinity of the target device; identifying, by the server, at least one ESL node of the ESL nodes which satisfy a criterion based on the signal measurements; and determining, by the server, a position of the target device based on a subset of locations including the locations associated with the at least one ESL node.

In an additional aspect of the disclosure, an apparatus includes a memory storing processor-readable code and at least one processor coupled to the memory. The at least one processor is configured to execute the processor-readable code to cause the at least one processor to perform operations comprising: receiving, from a target device, signal measurements of at least a first subset of electronic shelf label (ESL) nodes in a vicinity of the target device; identifying at least one ESL node of the ESL nodes which satisfy a criterion based on the signal measurements; and determining a position of the target device based on a subset of locations including the locations associated with the at least one ESL node.

In an additional aspect of the disclosure, a non-transitory computer-readable medium stores instructions that, when executed by a processor, cause the processor to perform operations. The operations include: receiving, from a target device, signal measurements of at least a first subset of electronic shelf label (ESL) nodes in a vicinity of the target device; identifying at least one ESL node of the ESL nodes which satisfy a criterion based on the signal measurements; and determining a position of the target device based on a subset of locations including the locations associated with the at least one ESL node.

In an additional aspect of the disclosure, an electronic shelf label (ESL) system comprises ESL nodes and a server comprising: a memory; and at least one processor coupled to the memory and configured to perform operations comprising: receiving, from a target device, signal measurements of at least a first subset of electronic shelf label (ESL) nodes in a vicinity of the target device; identifying at least one ESL node of the ESL nodes which satisfy a criterion based on the signal measurements; and determining a position of the target device based on a subset of locations including the locations associated with the at least one ESL node.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

Devices, networks, and systems may be configured to communicate via one or more portions of the electromagnetic spectrum. The present disclosure describes certain aspects with reference to certain communications technologies, such as Bluetooth or Wi-Fi. However, the description is not intended to be limited to a specific technology or application, and one or more aspects described with reference to one technology may be understood to be applicable to another technology. Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus, and methods described herein may be applied to other communications systems and applications than the particular examples provided.

For example, the described implementations may be implemented in any device, system, or network that is capable of transmitting and receiving RF signals according to any of the wireless communication standards, including any of the IEEE 802.11 standards, the IEEE 802.15.1 Bluetooth® standards, Bluetooth low energy (BLE), code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, 5G New Radio (5G NR), 6G, or other known signals that are used to communicate within a wireless, cellular, or internet of things (IoT) network, such as a system utilizing 3G, 4G 5G, or 6G technology, or further implementations thereof.

In various implementations, the techniques and apparatus may be used in wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably and may refer to a collection of devices capable of communicating with each other through one or more communications techniques.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, or packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.).

Implementations may range from chip-level or modular components to non-modular, non-chip-level implementations and further to aggregated, distributed, or original equipment manufacturer (OEM) devices or systems incorporating one or more described aspects. In some settings, devices incorporating described aspects and features may also include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, or constitutions.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

As used herein, including in the claims, the term "or," when used in a list of two or more items, means that any one of the listed items may be employed by itself, or any combination of two or more of the listed items may be employed. For example, if a device is described as containing components A, B, or C, the device may contain A alone; B alone; C alone; A and B in combination; A and C in combination; B and C in combination; or A, B, and C in combination.

Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

Also, as used herein, the term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

Also, as used herein, relative terms, unless otherwise specified, may be understood to be relative to a reference by a certain amount. For example, terms such as "higher" or "lower" or "more" or "less" may be understood as higher, lower, more, or less than a reference value by a threshold amount.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 7 is a flow chart of an example method for location fingerprinting using nodes of an ESL infrastructure deployed within an environment according to some embodiments of this disclosure.

Like reference numbers and designations in the various drawings indicate like elements.

DETAILED DESCRIPTION

Figure 1A:
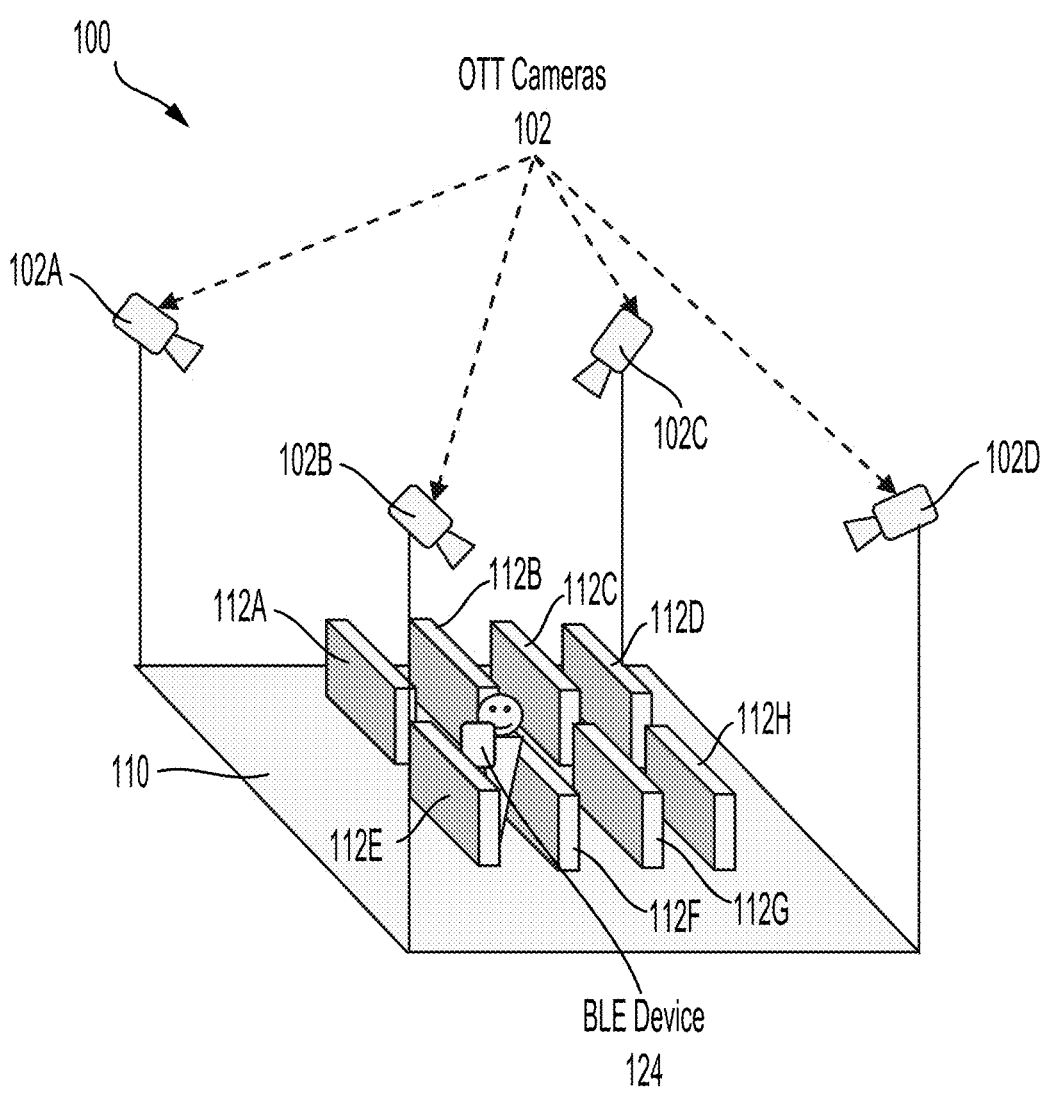
FIG. 1A is a block diagram illustrating a perspective view of an example Electronic Shelf Label (ESL) system within a retail environment according to some embodiments of this disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support indoor positioning of various devices or objects within an indoor environment, such as a retail environment associated with a retail store or distribution warehouse. In some embodiments, an Electronic Shelf Label (ESL) system may be deployed within the environment for purposes of monitoring assets (e.g., product locations), tracking inventory, and providing indoor positioning and navigation services for users (e.g., customers or store employees) within the environment. The ESL system may include a dense deployment of ESL devices across multiple gondolas throughout the environment. For example, each gondola may include multiple shelves and each shelf may include one or more ESL devices, e.g., for displaying pricing and other relevant information regarding products placed on the shelf.

In some implementations, each gondola may also include an energizer device that serves as a power source for supplying power to the ESL devices on the shelves of the gondola via a wired or wireless connection. Such an energizer may be a specialized wireless device installed on a shelf of the gondola that broadcasts energizing waveforms to be harvested as usable energy by the ESL devices and other ambient devices (such as Internet of Things (IoT) tags) located in the surrounding area, which do not have their own power source. The energizer itself may be powered by a battery or other power source. The ESL devices, energizers, other devices (such as access points) of the ESL system may represent different nodes of an infrastructure of the ESL system (or "ESL infrastructure").

Particular implementations of the subject matter described in this disclosure may be implemented to realize one or more of the following potential advantages or benefits. In some aspects, the present disclosure provides techniques for wireless communication systems that may be particularly beneficial in ESL applications for indoor positioning. For example, the disclosed techniques may be used to build and maintain a scalable database of fingerprinting measurements based on positioning signals exchanged between different nodes of the ESL infrastructure deployed at known locations within an environment (e.g., a retail environment). Such a database may include a set of measurements collected by each node of the ESL infrastructure based on the positioning signals transmitted by other ESL infrastructure nodes. The set of measurements stored in the database for each infrastructure node may represent a "fingerprint" of that node's signal transmission reception characteristics at a known location of that node within the environment relative to other nodes of the ESL infrastructure.

In some embodiments, such a fingerprint database may be used by a server of the ESL system to provide indoor positioning services for a target device (e.g., a mobile device or IoT tag) associated with a user or product within the environment. For example, the server may determine the position of the target device by matching positioning measurements received from the target device with the fingerprinting measurements stored in the fingerprint database for at least one node of the ESL infrastructure deployed at a known location within the environment. The position of the target device in this example may correspond to the known location of the at least one node for which the corresponding fingerprinting measurements stored in the fingerprint database match the positioning measurements received from the target device. The nodes of the ESL infrastructure may include any various devices or components of the ESL system deployed within the environment. Examples of such infrastructure nodes include, but are not limited to, ESL devices, access points, one or more gateway nodes, and energizer devices used to supply power to other infrastructure nodes over a wired or wireless network.

By using dedicated devices or nodes of an ESL infrastructure deployed within the environment, the disclosed fingerprinting techniques are more scalable than conventional survey-based approaches to fingerprinting. Also, by coordinating the transmission and measurement of the positioning signals exchanged between different ESL infrastructure nodes to mitigate the impact of signal interference, the fingerprinting measurements acquired using the disclosed techniques are less susceptible to noise and therefore, produce more accurate estimates of a target device's position within the environment relative to those acquired using conventional techniques.

The terms "fingerprinting" and "location fingerprinting" are used interchangeably herein to refer broadly and inclusively to the process of using past or previously acquired measurements of positioning signals as a basis for estimating a position of a device or object within an environment. Fingerprinting generally involves recording positioning measurements that serve as a ground truth for signal reception characteristics associated with a known position within the environment. Such ground-truth measurements may provide a reference point that can later be used for positioning a device (or "target device") within the environment based on measurements received from the target device that match the previous ground-truth measurements.

The terms "environment" and "retail environment" are used interchangeably herein to refer broadly and inclusively to any physical space or layout (e.g., within a physical "brick-and-mortar" retail store or distribution warehouse) where a business operates (e.g., to provide products or services to customers). An example of such an environment will be described in further detail below with reference to FIGS. 1A and 1B.

FIG. 1A is a block diagram illustrating a perspective view of an example ESL system 100 within a retail environment according to some embodiments of this disclosure. As shown in FIG. 1A, the ESL system 100 may be deployed across multiple aisles of gondolas 112A-112H within a retail environment 110. The retail environment 110 may include, for example, a retail floor space of a retail store. As will be described in further detail below, each of the gondolas 112A-112H may include one or more shelves to which a plurality of ESL devices are attached. The ESL devices may be used to display pricing and/or other information related to products located on the shelves. Each of the ESL devices may include one or more wireless radios for transmitting and receiving information over a wireless network. Such radios may support any of various wireless communication standards and technologies. Examples of such technologies include, but are not limited to, Wi-Fi, Bluetooth, Bluetooth Low Energy (BLE), 5G NR, ultra-wideband (UWB), and other RF technologies.

As will be described in further detail below with respect to FIG. 1B, cameras may be installed on or near the shelves at the ends of the gondolas 112A-112H to capture different views of the aisles and/or other pathways in the areas surrounding the gondolas 112A-112H. Additionally, over-the-top (OTT) cameras 102A-102D (or "OTT cameras 102" collectively) may be positioned at different overhead locations throughout the retail store to capture larger regions of the retail environment 110. In some implementations, the OTT cameras 102 may be part of a separate surveillance system of the retail store used for security and monitoring purposes.

In some embodiments, images and/or video captured by the OTT cameras 102 and/or those captured by the shelf cameras on the gondolas 112A-112H may be utilized as visual channel state information (CSI) to reduce, if not resolve, any errors or ambiguities detected in the position of a BLE device 124 within the retail environment 110. The BLE device 124 may be, for example, a mobile device of a user (e.g., a customer or employee of the retail store). Alternatively, the BLE device 124 may be an ambient IoT tag associated with a product or a user within the retail environment 110. The BLE device 124 may be equipped with a BLE radio for receiving low power beacon signals transmitted by the ESL devices attached to the gondolas 112A-112H. In some implementations, radio frequency (RF) measurements of the signals received by the BLE device 124 from nearby ESL devices may be provided to a management server of the ESL system 100 for determining the position of the BLE device 124 within one or more areas of the retail environment 110.

Figure 1B:
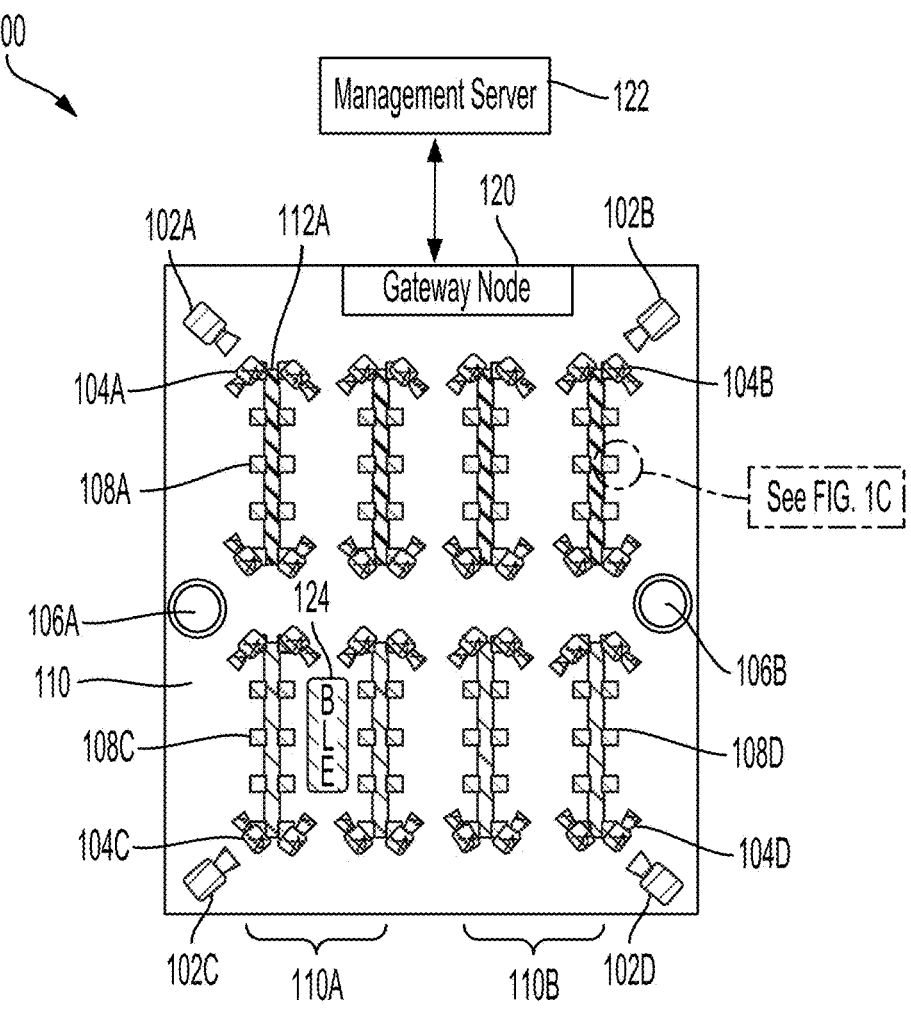
FIG. 1B is a block diagram of an overhead view of the ESL system of FIG. 1A according to some embodiments of the disclosure.

FIG. 1B is a block diagram of an overhead view of the ESL system 100 of FIG. 1A according to some embodiments of the disclosure. As shown in FIG. 1B, the ESL system 100 may further include a management server 122 that is integrated with or coupled to a gateway node 120. The management server 122 may include at least one processor coupled to a memory, in which the at least one processor is configured to execute computer program code stored on a computer-readable medium to cause the management server 122 to perform operations related to the management and control of ESL devices 108A-108D, access points (APs) 106A and 106B, the gateway node 120, and/or other components of the ESL system 100. In some embodiments, the management server 122 may perform operations for locating ESL devices (including the ESL devices 108A-108D) in the environment 110 based, at least in part, on visual data acquired by a camera of the BLE device 124 during a survey of the environment 110, as will be described in further detail below with reference to FIGS. 5-7.

The gateway node 120 may communicate with access point (AP) 106A and access point (AP) 106B. Although only two APs are shown in the example of FIG. 1B, fewer or more APs may be included in the ESL system 100. The APs 106A and 106B may communicate through a first communication network, either wired or wireless, with the gateway node 120. The APs 106A and 106B may also communicate through a second communication network with the ESL devices 108A-108D. In some embodiments, the first and second communication networks may be different networks. For example, the first communication network (e.g., between the AP 106A and the gateway node 120) may be a Wi-Fi network, and the second communication network (e.g., between the AP 106A and the ESL device 108A) may be a Bluetooth network. In some implementations, the APs 106A and 106B (and other components of the ESL system 100) may be part of a wireless infrastructure of the retail environment 110 that supports one or more wireless technologies (e.g., Wi-Fi, Bluetooth, BLE, and/or UWB).

In some embodiments, each of the APs 106A and 106B may communicate with a subset of the ESL devices 108A-108D located in a geographic area assigned to that AP, e.g., based on a location of the AP relative to each ESL device and/or a signal coverage area of the AP. For example, the retail environment 110 may be divided into two equally-sized geographic areas that each cover approximately half of the total retail environment 110. The AP 106A may be assigned to a geographic area 110A, and the AP 106B may be assigned to a geographic area 110B. Accordingly, the AP 106A may communicate with ESL device 108A and ESL device 108B located in the geographic area 110A, and the AP 106B may communicate with ESL device 108C and ESL device 108D located in the geographic area 110B.

Bluetooth technology provides a secure way to connect and exchange information between electronic devices, such as smartphones, other cellular phones, headphones, earbuds, smartwatches, laptops, wearables, and/or shelf labels. Bluetooth communications may include establishing wireless personal area networks (PANs) (also referred to as "ad hoc" or "peer-to-peer" networks). These ad hoc networks are commonly called "piconets." Each device may belong to multiple piconets. Multiple interconnected piconets may be called scatternets. A scatternet may be formed when a member of a first piconet elects to participate in a second piconet. In the example of FIG. 1B, the ESL devices 108A and 108C may be in a piconet with the AP 106A.

Because many of the services offered over Bluetooth can expose private data or allow the connecting party to control the connected device, Bluetooth networks may have devices first establish a "trust relationship" before they are allowed to communicate private data to one another. This trust relationship may be established using a process referred to as "pairing," in which a bond is formed between two devices. This bond enables the devices to communicate with each other in the future without further authentication. Thus, the ESL device 108A in FIG. 1B may be bonded in such a manner to the AP 106A. The pairing process may be triggered automatically each time the device is powered on or moved within a certain distance of another Bluetooth device. Pairing information relating to current and previously established pairings may be stored in a paired device list (PDL) in the memory of the Bluetooth device, such as the ESL device 108A and/or the AP 106A. This pairing information may include a name field, an address field, a link key field, and other similar fields (such as "profile" type) useful for authenticating the device or establishing a Bluetooth communication link. The pairing information may allow the ESL device 108A to reconnect to the AP 106A automatically when, for example, power loss causes the ESL system 100 to reset.

A Bluetooth "profile" describes general behaviors through which Bluetooth-enabled devices communicate with other Bluetooth devices. For example, the hands free profile (HFP) describes how a Bluetooth device (such as a smartphone) may place and receive calls for another Bluetooth device, and the Advanced Audio Distribution Profile (A2DP) describes how stereo-quality audio may be streamed from a first Bluetooth device (such as a smartphone) to another Bluetooth device (such as an earbud). The ESL devices 108A-108D may be configured with an ESL Profile compliant with, for example, the Electronic Shelf Label Profile Specification v1.0 dated Mar. 28, 2023, which is incorporated by reference herein. The ESL Profile may specify how the AP 106A may use one or more ESL Services exposed by the ESL device 108A.

In some embodiments, the management server 122 may include or be coupled to a database that stores and manages information regarding inventory (e.g., products) and other assets (the ESL devices 108A-108D and other components of the ESL system 100) in the retail environment 110. The management server 122 may include or be coupled to a database that stores and manages a variety of information used in the operation of a retail store or distribution warehouse. Such information may include product information regarding products displayed in the store as well as the location, layout, and other relevant information associated with each component of the ESL system 100 (including each of the ESL devices 108A-108D and the APs 106A and 106B). In some implementations, the database may be part of an Enterprise Resource Planning (ERP) inventory management system associated with the retail environment 110. The ERP inventory management system may be implemented either separately from or as a part of the ESL system 100.

In some embodiments, the management server 122 may generate and transmit command messages to the ESL devices 108A-108D via the first communication network described above. The command messages may be used by the management server 122 to carry out various functions in the ESL system 100, such as the synchronization, updating, and alteration of product information displayed on the ESL devices 108A-108D. The management server 122 may obtain the product information from a product database provided for the ESL devices 108A-108D. That is, the management server 122 may be provided with a database that stores identification information relating to the ESL devices 108A-108D in connection with product information to be displayed on a corresponding one of the ESL devices 108A-108D.

A command message created by the management server 122 (e.g., a product-information change message or a management-information acquisition message) can be transferred to the gateway node 120 as part of a packet suitable for a communication scheme used with the gateway node 120. Furthermore, the management server 122 may receive a reception acknowledgement message sent from the gateway node 120 using the communication scheme. In some cases, the acknowledgement message may be first converted into a message format suitable for reception by the management server 122 before being transferred by the gateway node 120. In some embodiments, the command messages transmitted by the management server 122 via the gateway node 120 may include commands for configuring different devices or nodes (including the APs 106A and 106B as well as the ESL devices 108A-108D) of the ESL infrastructure for purposes of scheduling the transmission and measurement of positioning signals amongst the nodes during a fingerprinting process. As will be described in further detail below, the measurements collected by each node of the ESL infrastructure during the fingerprinting process may be used to build and maintain a fingerprint database, which in turn may be used by the management server 122 to determine the position of a target device (e.g., the BLE device 124) within the environment 110.

Although only one gateway node 120 is shown in FIG. 1B, the ESL system 100 may include several such gateway nodes communicating with the management server 122. Each gateway node 120 analyzes data received from the management server 122, confirms the presence or absence of a message or data to be sent to one or more of the ESL devices 108A-108D, and then sends the confirmed message or data to the appropriate ESL device. For example, the gateway node 120 may configure a message, which is to be sent to the ESL device 108A, into a packet according to a communication scheme and send the configured packet to the ESL device 108A by commanding the AP 106A to transmit the packet. Furthermore, the gateway node 120 may transfer a reception acknowledgement message received from the ESL device 108A through the AP 106A to the management server 122.

In some embodiments, each of the ESL device 108A-108D may be configured with a memory, a microprocessor, and other components (such as a wireless radio) for performing various operations. An example of such an ESL device configuration will be described in further detail below with reference to FIG. 4.

Figure 1C:
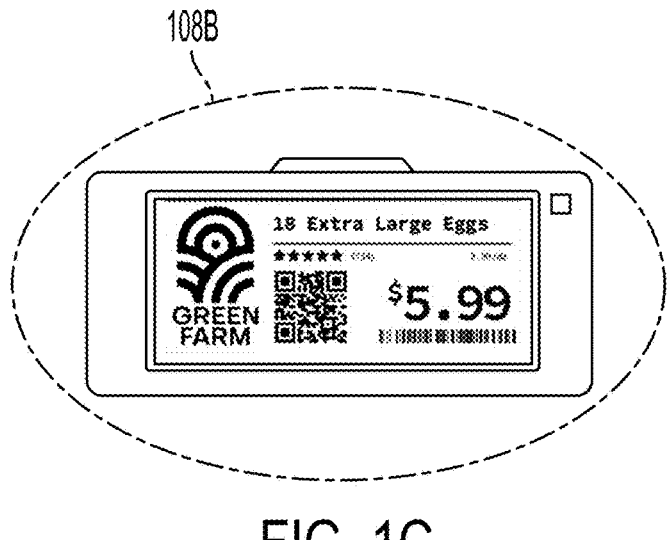
FIG. 1C is a diagram illustrating an example ESL device in the ESL system of FIGS. 1A and 1B according to some embodiments of the disclosure.

Each of the ESL devices 108A-108D may also include a display, such as a Liquid Crystal Display (LCD) or electronic ink (e-ink) display, for displaying data concerning products located on a shelf to which the corresponding ESL device is attached. The information displayed by each of the ESL devices 108A-108D may be received from the gateway node 120. The ESL devices 108A-108D may change price information or be activated or inactivated while communicating with the gateway node 120. A store manager may send the management server 122 a command concerning the synchronization between a product and a specified ESL device and/or a command for the correction of information regarding a product assigned to the particular ESL device. An example of the ESL device 108B is shown in FIG. 1C with a display device for displaying product information, such as a product description, a product image, a product price, a product barcode, a product rating, a product Stock Keeping Unit (SKU), and/or a product link (e.g., a URL or QR code).

In some embodiments, a video monitoring system may be included as part of the ESL system 100 or used to augment the capabilities of the ESL system 100. As described above, cameras may be installed on or near the shelves at the ends of the gondolas 112A-112H to capture different views of the aisles between the gondolas 112A-112H and/or other pathways in the areas surrounding the gondolas 112A-112H. For example, shelf cameras 104A-104D may be positioned with a field of view capturing one or more shelves of one or more of the gondolas 112A-112H. The shelf cameras 104A-104D may be used to assist in tracking stock levels and/or identifying items picked by users while in the environment. Also, as described above, OTT cameras 102A-102D may be positioned with a field of view capturing large regions of the retail environment 110. The visual information (e.g., images and/or video) captured by the OTT cameras 102A-102D and the shelf cameras 104A-104D may be transmitted to the management server 122 for processing.

In some implementations, the management server 122 may apply object recognition models or algorithms to the image frames received from the OTT cameras 102A-102D and/or shelf cameras 104A-104D to determine a presence of, or count of, people and objects (including products and ESL devices on shelves) located in the field of view of a respective camera. For example, the OTT cameras 102A-102D and/or shelf cameras 104A-104D may be used to support the determination of the locations of the ESL devices 108A-108D and/or other devices or nodes (e.g., APs 106A and 106B) of the ESL infrastructure within the retail environment 110.

As described above, the retail environment 110 associated with the ESL system 100 may include multiple ESL devices (including ESL devices 108A-108D) organized on shelves of gondolas located throughout the environment 110. One example illustration of such a gondola with an arrangement of ESL devices is shown in FIG. 2A.

Figure 2A:
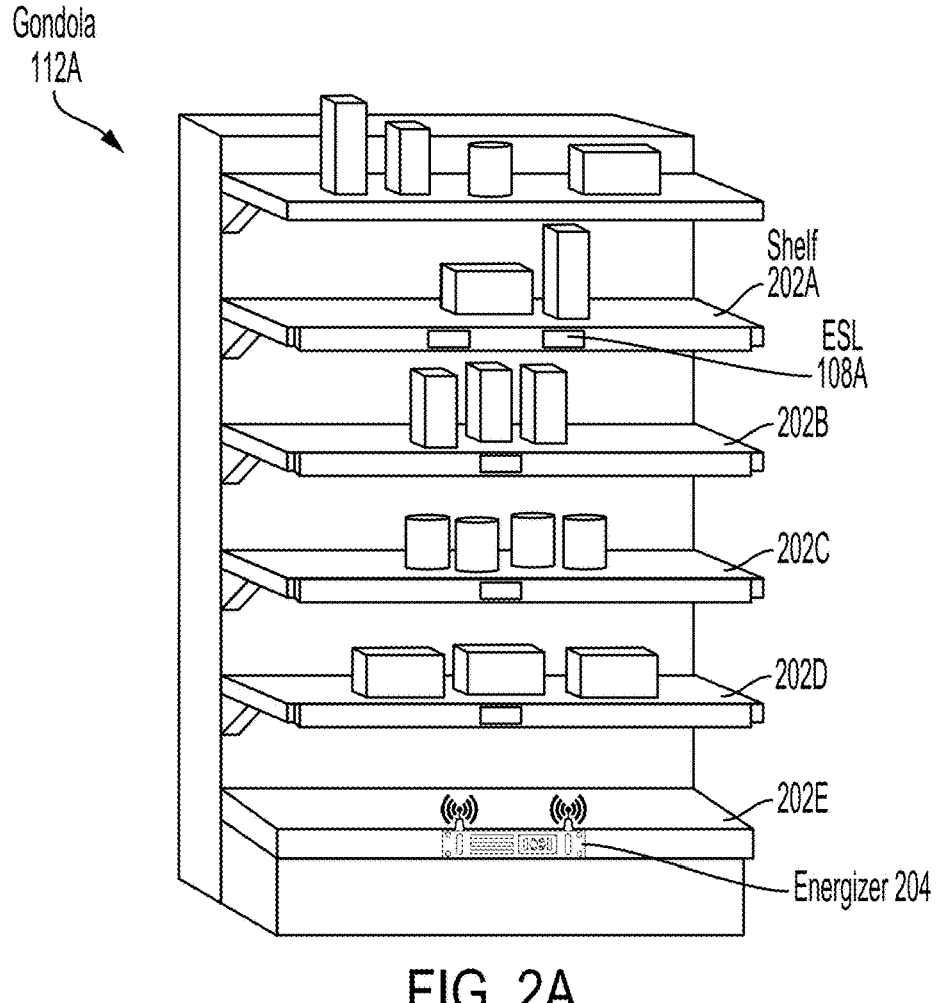
FIG. 2A is a perspective view of a gondola including shelves with ESL devices for displaying information regarding products available for selection by a user within a retail environment according to some embodiments of the disclosure.

FIG. 2A is a perspective view of a gondola 112A with ESL devices arranged on various shelves according to some embodiments of the disclosure. The gondola 112A may include multiple shelves 202A-202E at different vertical levels from a floor. ESL devices and other devices of the ESL infrastructure may be attached to the shelves 202A-202E. For example, ESL device 108A may be attached to shelf 202A to display information regarding products stocked on shelf 202A in a vicinity of the ESL device 108A. Furthermore, an energizer 204 may be installed on shelf 202E to supply power to the ESL devices on the gondola 112A and/or other ambient devices (e.g., IT tags attached to products) located in a vicinity of the energizer 204. In some implementations, the energizer 204 may be a wireless device that broadcasts radio waves or other energizing waveforms for powering ESL devices, ambient IoT tags, or other devices that lack power supplies of their own through energy harvesting. For example, such ambient devices may include circuitry that harvests energy from the energizing waveforms transmitted by the energizer 204. The harvested energy may then be used by the ambient devices to broadcast beacon signals for purposes of fingerprinting, positioning, and/or providing other device-specific functionality.

Figure 2B:
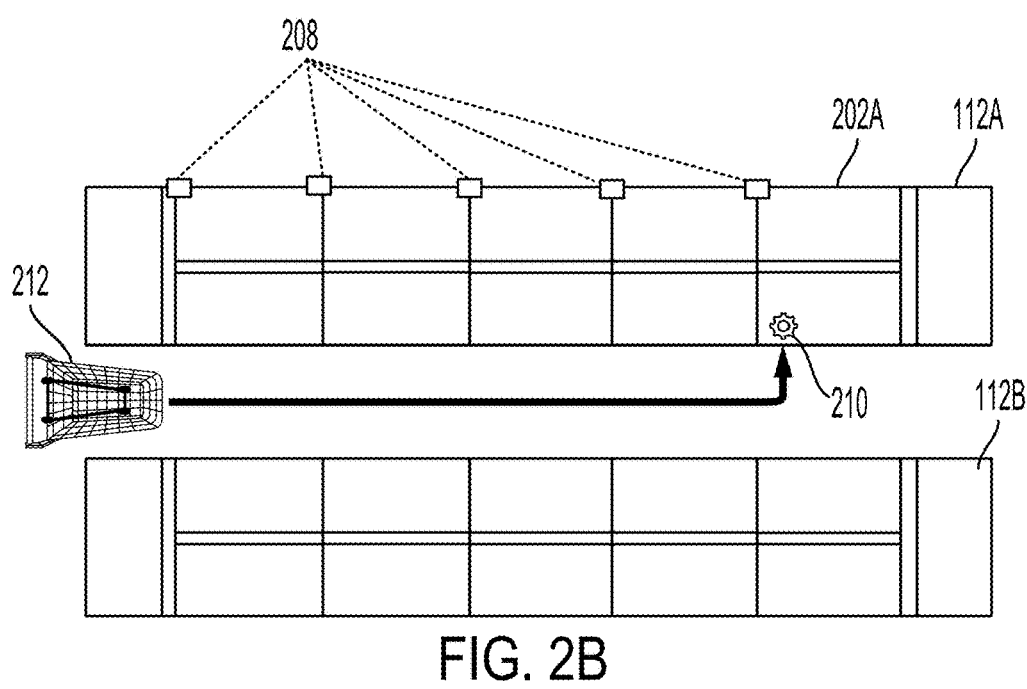
FIG. 2B is a top-down view of an example product region corresponding to an aisle between two gondolas within the retail environment of FIG. 2A according to some embodiments of the disclosure.

The ESL devices may provide information regarding products and/or position information to assist with location-based services for a user (e.g., a shopper or store worker) within the environment. FIG. 2B is a top-down view of a retail environment with ESL devices accessible to a user according to some embodiments of the disclosure. As shown in FIG. 2B, gondola 112A may include a dense deployment of ESL devices 208 (including the ESL device 108A of FIG. 2A) in which adjacent ESL devices may be uniformly spaced along the shelf 202A. Additional ESL devices may be similarly positioned along other shelves of gondola 112A and along the shelves of gondola 112B.

A user pushing a shopping cart 212 through the aisle between the gondolas 112A and 112B may use the ESL devices 208 to determine the location of a particular product. For example, a wireless device associated with the shopping cart 212 and/or a mobile device (e.g., BLE device 124 of FIGS. 1A and 1B) of the user may use RF measurements of radio signals broadcasted by the ESL devices 208 (and/or other nearby ESL devices) to estimate a current location of the shopping cart 212 (and user) within the environment and guide the user to a location 210 of a desired product on the appropriate shelf of gondola 112A.

Figure 3:
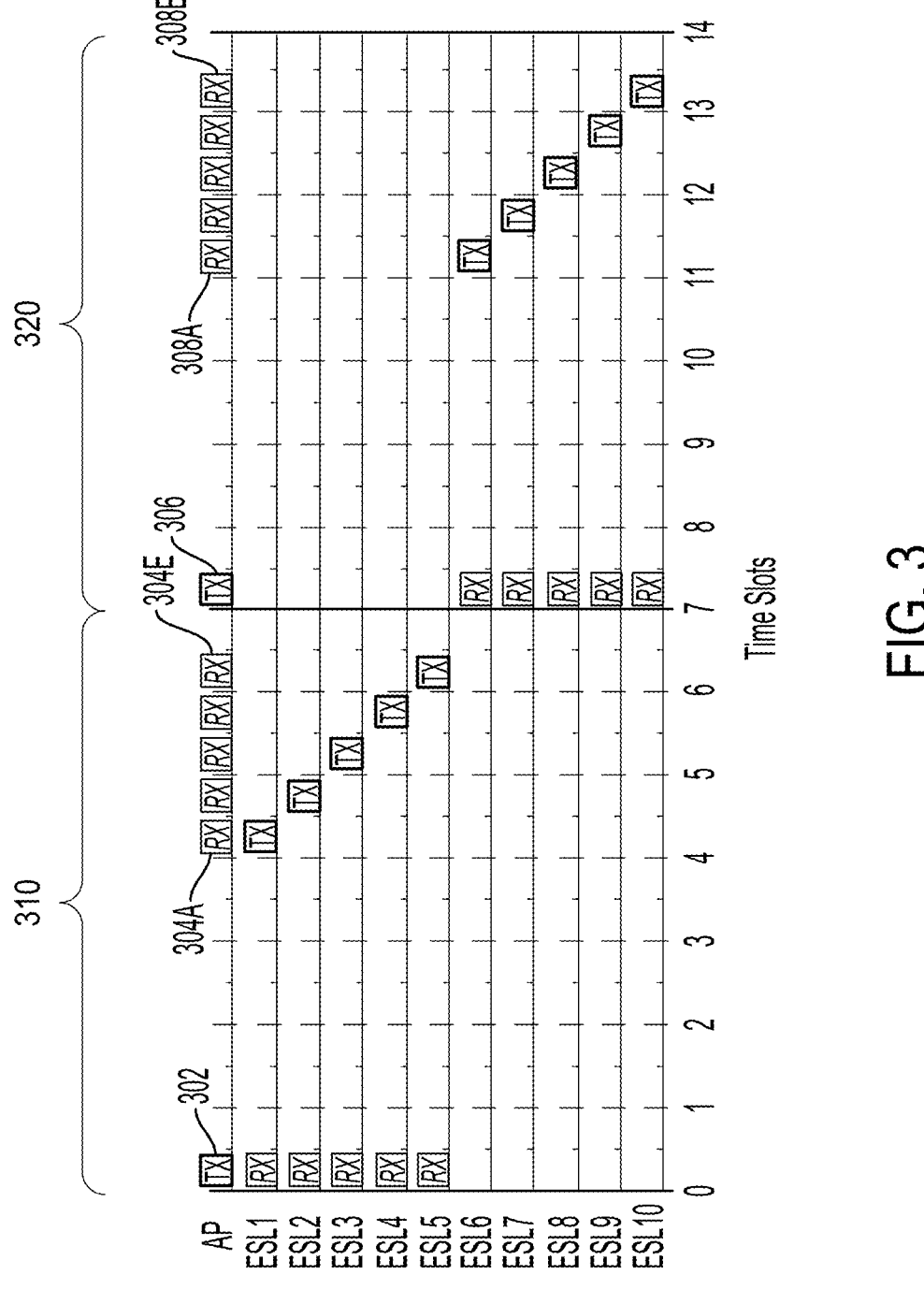
FIG. 3 is a timing diagram illustrating a time division multiplexing scheme for scheduling communications between different nodes of an ESL infrastructure according to some embodiments of the disclosure.

In some embodiments, communication between an AP and the ESL devices of an ESL system, such as between the AP 106A and ESL devices 108A-108D of the ESL system 100 of FIG. 1B, may be performed according to a Time Division Multiple Access (TDMA) scheme, as illustrated in FIG. 3. FIG. 3 is a timing diagram illustrating a time division multiplexing scheme 300 for scheduling communications between different nodes of an ESL infrastructure according to some embodiments of the disclosure. The nodes in this example may include an AP and various ESL devices of an ESL system deployed at known locations within an environment (e.g., retail environment 110 of FIGS. 1A and 1B, as described above). As shown in FIG. 3, an AP and each ESL device of the ESL system may be allocated one of various time periods corresponding to different time slots for transmitting or receiving information. It should be appreciated that a similar TDMA scheme may be used for scheduling communications between different ESL devices.

In ESL systems with significant numbers of ESL devices, the ESL devices may be configured to communicate with the AP in different groups, where each group may correspond to a different time frame. For example, a first group of ESL devices (ESL1-ESL5) in FIG. 3 may be configured to communicate with the AP during a first time frame 310, and a second group of ESL devices (ESL6-ESL10) may be configured to communicate with the AP during a second time frame 320. The first and second time frames 310 and 320 may alternate during operation of the wireless network. The AP in this example may transmit or broadcast information that is received by the first group of ESL devices during a first time period (or time slot) 302 in the first time frame 310. The ESL devices in this first group may transmit information to the AP during subsequent time periods/slots in the time frame 310. For example, the first ESL device (ESL1) may transmit information received by the AP during a time period 304A, with the other ESL devices (ESL2-ESL5) in this group transmitting during time periods 304B-304E, respectively, in the time frame 310. Likewise, the AP may transmit information received by the second group of ESL devices during a time period 306 in the second time frame 320. The ESL devices (ESL6-ESL10) in this second group may transmit information received by the AP during respective time periods 308A-308E in the time frame 320.

Figure 4:
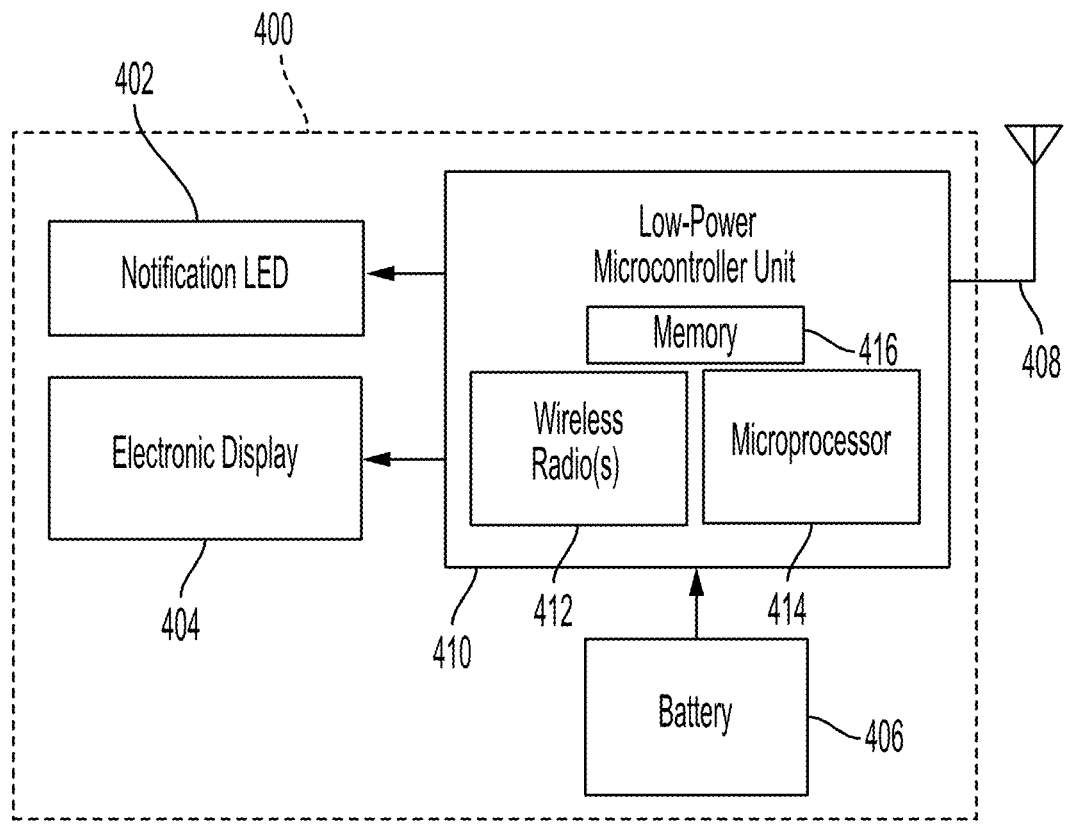
FIG. 4 is a block diagram illustrating an example configuration of an ESL device according to some embodiments of this disclosure.

An ESL device may include components configured together to provide some or all of the functionality described in this disclosure and/or provide additional functionality. FIG. 4 is a block diagram illustrating an example ESL device 400 according to some embodiments of this disclosure. For example, the ESL device 400 may be used to implement each of the ESL devices (including the ESL devices 108A-108D) of the ESL system 100 described above with respect to FIGS. 1A-2B. The ESL device 400 may include a low-power microcontroller 410. Although functionality for the ESL device may be configured by the microcontroller 410 in embodiments of this disclosure, any single or combination of processors (e.g., at least one processor) may be used to perform the functions described according to embodiments of this disclosure.

The microcontroller 410 may include a memory 416. The memory 416 may store computer program code that causes a microprocessor 414 to execute operations that carry out some or all of the functionality described with respect to various embodiments of this disclosure. Although shown as part of the microcontroller 410, the memory 416 may be located internal to or external to the microcontroller 410. The microcontroller 410 may also include one or more wireless radio(s) 412. The wireless radio(s) 412 may include, for example, a Bluetooth wireless radio including a front end that couples to antenna 408 for transmitting and receiving radio frequency (RF) signals at one or more frequencies in one or more frequency bands. In some embodiments, the microcontroller 410 is a System on Chip (SoC) in which two or more components of the wireless radio(s) 412, the microprocessor 414, and/or the memory 416 are included in a single semiconductor package. In some embodiments, the two or more components may be included on a single semiconductor die.

The ESL device 400 may include I/O devices, such as a notification LED 402 and/or an electronic display 404. The notification LED 402 may include one or more light emitting diodes (LEDs), or other light sources configured to flashlight of one or more colors. The notification LED may be triggered to blink at a specific time and/or with a specific color based on a command received from the gateway node 120. For example, a notification LED 402 may blink to attract a user's attention to a particular location on a shelf. The electronic display 404 may be, for example, an e-ink display configured to output the product information.

The ESL device 400 may couple to a battery 406 or other power source to power operations performed by the ESL device 400, such as to operate the wireless radio(s) 412, the notification LED 402, the electronic display 404, the memory 416, and/or the microprocessor 414. The battery 406 may allow placement of the ESL device 400 in a place where constant power supply is difficult. Thus, in order that a single battery charge provides a long period of use (e.g., lasting longer than several years), the ESL device 108 may be configured to reduce power consumption during times when frequent commands are not expected. For example, the ESL device 400 may operate using a wakeup communication scheme. That is, the ESL device 400 wakes up according to predetermined time intervals to determine whether data is waiting to be received. When no data is waiting, power to the ESL device 400 is turned off until the next wakeup period to reduce power consumption. When there is data to be received or transmitted, the ESL device 400 wakes up to perform communication operations. For example, the ESL device 400 may wake up in response to receiving a command message from a gateway node (e.g., gateway node 120 of FIG. 1B, as described above) or a management server (e.g., management server 122 of FIG. 1B) of the ESL system, as will be described in further detail below.

As described above, the command messages transmitted by the management server may include commands for configuring various ESL devices and/or other devices of the ESL system during a fingerprinting process used to build a fingerprint database. The ESL devices and other devices or components of the ESL system (e.g., APs 106A and 106B of FIG. 1B and/or energizer 204 of FIG. 2A, as described above) may represent different nodes of the corresponding ESL infrastructure that are deployed at known locations within the environment. As will be described in further detail below with respect to FIGS. 5-7, the fingerprinting process may involve each node of the ESL infrastructure collecting measurements based on the positioning signals transmitted by each of the other nodes during one or more time periods. The set of measurements collected by each node may represent a "fingerprint" of that node's signal reception characteristics at a known location of that node within the environment.

The management server may store the fingerprint (or set of fingerprinting measurements) for each node together with that node's known location in the fingerprint database for later access and retrieval. The fingerprinting measurements associated with each node may represent a set of ground-truth measurements that can later be used for estimating or determining the position of a target device (e.g., a user's mobile device or ambient IoT tag) within the environment. For example, positioning measurements received from the target device may be compared with the fingerprinting measurements stored for each node in the fingerprint database. The position of the target device may correspond to the known location of the node for which the fingerprinting measurements are the closest match to the positioning measurements received from the target device.

It is noted that one or more blocks (or operations) described above with reference to FIGS. 1A-4 may be combined with one or more blocks (or operations) described below with reference to one or more of FIGS. 5-7. For discussion purposes, the examples of FIGS. 5-7 will be described below with reference to the ESL devices and other components of the ESL system and/or environment of FIGS. 1A-4, as described above. However, it should be appreciated that the disclosed fingerprinting techniques are not intended to be limited thereto and that these techniques may be applied to any of various ESL systems and environments.

Figure 5:
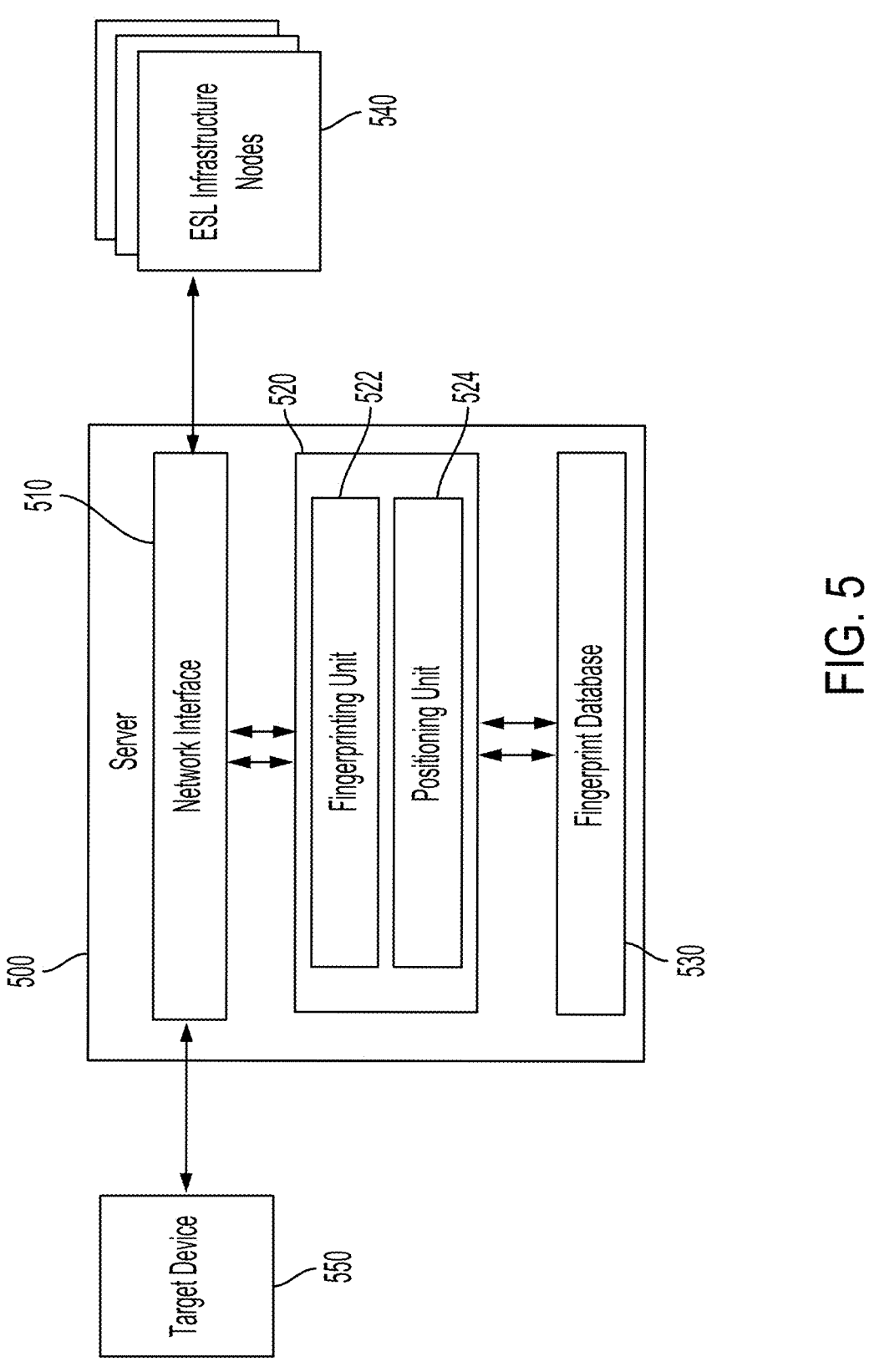
FIG. 5 is a block diagram of an example server for location fingerprinting using nodes of an ESL infrastructure deployed within an environment according to some embodiments of this disclosure.

FIG. 5 is a block diagram of an example server 500 for fingerprinting using nodes of an ESL infrastructure deployed within an environment according to some embodiments of this disclosure. The server 500 may be used to implement, for example, a management server of an ESL system (e.g., management server 122 of the ESL system 100 of FIG. 1B, as described above) deployed within an environment (e.g., retail environment 110 of FIGS. 1A and 1B, as described above). As shown in FIG. 5, the server 500 includes a network interface 510, a fingerprint manager 520, and a fingerprint database 530. The fingerprint manager 520 may include a fingerprinting unit 522 and a positioning unit 524.

As will be described in further detail below, the server 500 and its components or subcomponents (including the fingerprinting unit 522 and the positioning unit 524 of the fingerprint manager 520) may use the network interface 510 to communicate with various ESL infrastructure nodes 540 and a target device 550 located within the environment via a communication network. Such a network may be any network or combination of networks that can carry data communications according to any of various communication standards. The network may include, but is not limited to, a wired or a wireless network. The network may also include a local area network, a medium area network, or a wide area network, such as the Internet. The network and network interface 510 may support any of various networking protocols and technologies as desired for a particular implementation. For example, although the network interface 510 is shown communicating directly with target device 550, the server 500 may communicate through network interface 510 to other components, such as APs, to communicate with the target device 550.

The ESL infrastructure nodes 540 may include dedicated devices or components of the ESL system infrastructure deployed within the environment. Examples of such infrastructure devices include, but are not limited to, ESL devices (e.g., ESL devices 108A-108D of FIG. 1B), access points (e.g., access points 106A and 106B of FIG. 1B), one or more gateway nodes (e.g., gateway node 120 of FIG. 1B), and energizer devices (e.g., energizer 204 of FIG. 2A) used to supply power to other infrastructure nodes over a wired or wireless network. It may be assumed that the respective locations of these infrastructure devices are already known. For example, the location of each infrastructure device or node may have been previously determined when the device/node was deployed within the environment.

In some implementations, the known location of each infrastructure node may be a coarse location that corresponds to a general zone, region, or other area of the environment (such as an aisle, gondola, or shelf) in which the node is located. The coarse location may be manually entered into an ERP system (e.g., by a store worker or an automated robot, such as an autonomous guided vehicle) during deployment. In some cases, the coarse location may serve as an initial position estimate for the infrastructure node that may be refined using any of various positioning techniques. For example, a more precise location of each infrastructure node may be determined based on a combination of RF measurements (e.g., received signal strength indicator (RSSI) values) collected for the node by a survey device in addition to visual information captured by the survey device and/or other devices (e.g., one or more shelf cameras 104A-104D and/or OTT cameras 102A-102D) during a survey of the environment.

In some embodiments, the fingerprinting unit 522 may use the network interface 510 of the server 500 to receive fingerprinting measurements from each of the ESL infrastructure nodes 540 deployed at known locations within the environment. The fingerprinting measurements received from each node may include various RF measurements of positioning signals transmitted by other nodes. The RF measurements may include, for example, RSSI values in addition to measurements of angle of arrival (AoA), time of arrival (ToA), and/or channel impulse response corresponding to the positioning signal transmissions received by each node from the other nodes, such as all the remaining infrastructure nodes deployed with that node in a particular area of the environment (e.g., corresponding to a gondola or a shelf thereof). The fingerprinting unit 522 may store the fingerprinting measurements received from each of the nodes 540 together with a known location of that node in the fingerprint database 530.

In some embodiments, the fingerprinting unit 522 may perform a fingerprinting process to acquire the fingerprinting measurements from the ESL infrastructure nodes 540 at different time periods. For example, a first set of fingerprinting measurements for a deployment of the ESL infrastructure nodes 540 within a retail environment (e.g., a retail store) may be acquired during an off-peak period (e.g., early morning hours on a weekday) when the number of users (e.g., shoppers) and corresponding user devices, which can be potential sources of interference, are expected to be relatively low. Likewise, a second set of fingerprinting measurements may be acquired during a peak period when the number of users and potential sources of interference are expected to be relatively high. This helps capture the effect of interference from user devices, which is inevitable in a retail environment but often unpredictable in terms of timing. Thus, the fingerprinting measurements received from the ESL infrastructure nodes 540 may be associated with one or more time periods during which the measurements were acquired within the environment.

The fingerprinting unit 522 may also store the relevant time period(s) when the measurements were acquired. Accordingly, the information stored for each node in the fingerprint database 530 may represent a fingerprint of the signal reception characteristics of a known location corresponding to that node within the environment during a particular time period. As will be described in further detail below, the fingerprint database 530 may be used by the positioning unit 524 to determine a position of a target device 550 within the environment based on the known location of a node whose stored fingerprint matches positioning measurements received from the target device 550.

In some implementations, the fingerprint database 530 may also include additional fingerprints of user locations that are crowdsourced or manually entered. For instance, a forklift in a retail environment may include specialized equipment (e.g., RF radios, a camera, a barcode scanner, etc.) that enable accurate measure of positioning signals at one or more locations or reference points within the environment. Hence, the positioning measurements collected by the forklift for a reference point within the environment may serve as an additional "virtual node" for which the positioning measurements may be stored in the fingerprint database 530 (e.g., by the fingerprinting unit 522) and used for subsequent positioning of the target device 550 (e.g., by the positioning unit 524).

In some embodiments, the matching of a fingerprint stored in the fingerprint database 530 with the positioning measurements received from the target device 550 may be performed using a machine learning model. For example, the fingerprinting measurements received by the fingerprinting unit 522 may be used to train the machine learning model during a fingerprinting phase of the operations performed by the server 500 (or fingerprint manager 520 thereof). The fingerprinting phase in this example may coincide with a training phase of the machine learning model. During a subsequent positioning phase, the positioning unit 524 may apply the positioning measurements received from the target device 550 along with at least a subset of the fingerprinting measurements from the fingerprint database 530 as inputs to the trained machine learning model to determine a position of the target device 550 within the environment, as will be described in further detail below. Any of various machine learning algorithms or models suitable for performing such fingerprint matching may be used as desired for a particular implementation. Examples of such machine learning models include, but are not limited to, a recurrent neural network (RNN) or other deep neural network (DNN), a long-short-term-memory (LSTM) model, a k-nearest neighbor model, a random forest model, and other machine learning models using logistic regression and/or probabilistic matching.

In some embodiments, the fingerprinting unit 522 may schedule fingerprinting amongst the ESL infrastructure nodes 540 by configuring each node to transmit or receive positioning signals at appropriate time periods, e.g., based on the time division multiplexing scheme 300 of FIG. 3, as described above. In some implementations, the fingerprinting unit 522 may send a command to each of the nodes 540 (or a selected group thereof) to transmit the positioning signals according to a plurality of transmission parameters. The transmission parameters may include, for example, a transmission power, a time slot, a beam identifier (ID), and a channel.

In some embodiments, the fingerprinting may be scheduled to emulate certain types of interference. For example, to emulate the impact of interference on the positioning signals exchanged between a group of the nodes 540 located within a given area of the environment, the fingerprinting unit 522 may schedule two or more of the nodes in the group to transmit over the same time slot and/or the same channel. The transmission powers and beam IDs used by each node in the group may be varied. During the positioning phase, appropriate fingerprint(s) of the positioning signals transmitted by one or more nodes in the group, as configured by the fingerprinting unit 522 during the fingerprinting phase, may be selected by the positioning unit 524 for estimating or determining a position of the target device 550 within the environment.

The fingerprint stored in the fingerprint database 530 for each of the nodes 540 may include a set of fingerprinting measurements (e.g., RSSI values, ToA or AoA measurements, and/or the channel impulse response) corresponding to the positioning signal transmissions received by that node from all the remaining infrastructure nodes 540. The fingerprint stored for each node may also include a set of transmission parameters associated with the transmissions received and measured by that node from the remaining nodes. The set of transmission parameters may include a range of transmission powers, a set of time slots, a set of beam IDs for different beams (including both omnidirectional and directional beams), and a set of channels (e.g., in a particular frequency band). An example of the set of transmission parameters associated with a fingerprint of an infrastructure node (Node 1) based on measurements of the positioning signals received by Node 1 from Nodes 2-4 is shown in Table 1.

TABLE 1

| Tx Node | Tx Power | Time Slot | Beam ID | Channel | RSSI |
|---------|----------|-----------|---------|---------|------|
| 2 | 20 dBm | 1 | 5 | 2 | −80 dBm |
| 3 | 10 dBm | 2 | 1 | 2 | −70 dBm |
| 4 | 10 dBm | 3 | 1 | 3 | −50 dBm |

While the transmission parameters for only three nodes are shown in Table 1, it should be appreciated that the fingerprint associated with each node (e.g., Node 1) of the ESL infrastructure may include the transmission parameters for any number of other infrastructure nodes. For example, the complete fingerprint stored in the fingerprint database 530 for Node 1 may include different combinations of transmission parameter values corresponding to the transmissions received from the remainder of the nodes 540.

In addition to scheduling the fingerprinting process to account for signal interference caused by other devices (e.g., user devices) within the environment, as described above, the fingerprinting process may be scheduled for one or more groups of nodes to conserve power during the fingerprinting process. The fingerprinting process may become increasingly power-intensive for the individual nodes 540 within the environment as the total number of nodes with which each node must communicate grows. This is especially true for listening nodes (such as battery-powered ESL devices), which may be required to wake up and listen for and/or receive positioning signals over extended periods of time.

In some embodiments, the fingerprinting unit 522 may use one or more criteria to schedule the fingerprinting process for one or more groups of nodes in a more energy efficient manner to conserve power. One such criterion may be the geometry or topology of the ESL infrastructure nodes 540 (or a group thereof) deployed within the environment. For example, all co-located nodes located within a certain area or region of the environment (and within a threshold distance of each other) may be excluded from having to wake up and perform fingerprinting measurements. In some implementations, two or more distinct subsets of nodes may be multiplexed (over time and/or frequency) to gather fingerprinting measurements for the group to conserve power based on their geometry or topology within the environment, as illustrated in FIG. 6.

Figure 6:
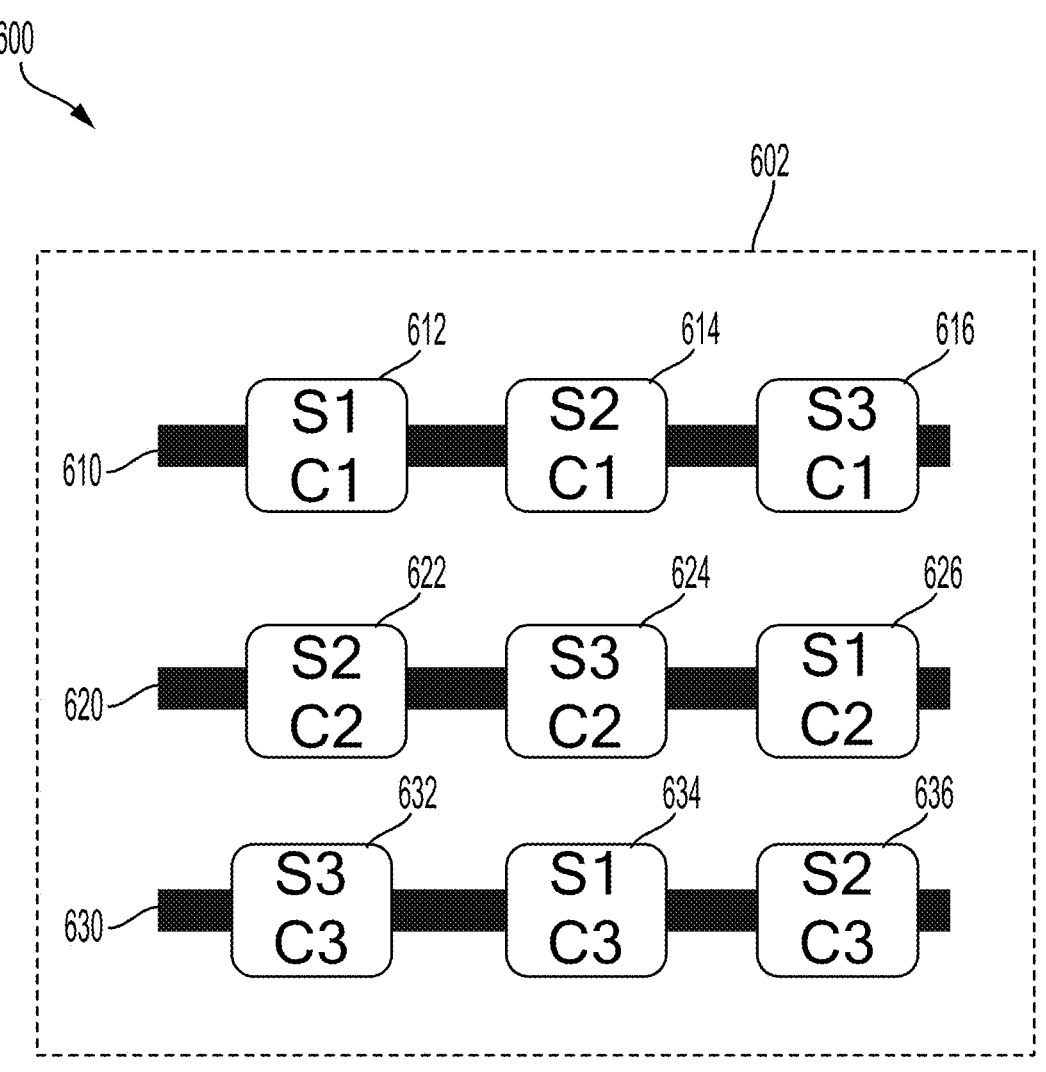
FIG. 6 is a diagram illustrating an example of a time and frequency division multiplexing scheme as applied to a group of nodes of an ESL infrastructure deployed within an environment to conserve power during fingerprinting according to some embodiments of this disclosure.

FIG. 6 is a diagram illustrating an example of a time and frequency division multiplexing scheme 600 as applied to a group of nodes of an ESL infrastructure deployed within an environment (e.g., environment 110 of FIGS. 1A and 1B, as described above) to conserve power during fingerprinting according to some embodiments of this disclosure. The nodes may be, for example, different ESL devices that are densely deployed across different shelves of a gondola 602 within an environment. However, it should be appreciated that the multiplexing scheme 600 is not intended to be limited to ESL devices and that the scheme 600 may be applied to any of various types of ESL infrastructure nodes (e.g., APs, energizers, and/or other components of the corresponding ESL system) deployed at known locations within an area or region of the environment.

As shown in FIG. 6, the gondola 602 may include a shelf 610, a shelf 620, and a shelf 630. The shelf 610 may include ESL devices 612, 614, and 616. Likewise, the shelf 620 may include ESL devices 622, 624, and 626, and the shelf 630 may include ESL devices 632, 634, and 636. However, the gondola 602 may include any number of shelves on which any number of ESL devices (or other ESL infrastructure nodes or devices) may be installed. As the ESL devices in this example are co-located on the gondola 602, two or more distinct subsets or groups of these devices may be multiplexed over time and frequency. For example, the ESL devices on each of shelves 610, 620, and 630 may be configured to operate during one of three time slots (S1, S2, and S3). Assuming a slot periodicity of three, each ESL device may operate in a low-power sleep mode for two of the three time slots and only have to wake up to perform measurements of positioning signals received from other ESL devices or infrastructure nodes during just one of the three time slots. Also, the group of ESL devices corresponding to each shelf may be configured to listen to only one of three channels (C1, C2, and C3). As shown in FIG. 6, the ESL devices 612, 614, and 616 on shelf 610 may be configured to listen for positioning signals transmitted over channel C1, the ESL devices 622, 624, and 626 on shelf 620 may be configured to listen to channel C2, and the ESL devices 632, 634, and 636 on shelf 630 may be configured to listen to channel C3.

Returning to FIG. 5, another criterion that the fingerprinting unit 522 may use to conserve power during the fingerprinting process is the layout of the retail environment. For example, prior knowledge of the layout of the environment may be used to down-select and determine an appropriate range for certain transmission parameters (e.g., a range of transmission powers and/or a range of beam IDs) to be used during the fingerprinting process. Additionally, for a given transmit node, a group of listening/receiving nodes within a threshold distance of the transmit node may be selected to take part in the fingerprinting process.

Yet another criterion that may be used by the fingerprinting unit 522 to conserve power is the type of frequency planning scheme used to schedule fingerprinting process. For example, an enterprise deployment of the ESL system and corresponding ESL infrastructure within the environment may apply a frequency planning scheme that reduces co-channel interference between the ESL infrastructure nodes 540. Such a scheme may be used by the fingerprinting unit 522 to down-select or reduce the total range of channels used during the fingerprinting process.

In some embodiments, the fingerprinting unit 522 may employ opportunistic fingerprinting to increase redundancy and robustness of the information stored in the fingerprint database 530. During a positioning or data communication session, for instance, different types of transmissions from the ESL infrastructure nodes 540 may occur based on their own schedules and/or protocols. Although such transmissions are not scheduled specifically for the purpose of building the fingerprint database 530, they may be incorporated into the database. In some implementations, such "opportunistic fingerprints" may be appended to the fingerprint database 530 and treated as an additional set of fingerprinting measurements that help provide redundancy and robustness. In some cases, a minimum closeness criterion or metric may be used to associate an opportunistic fingerprint (and corresponding measurements) with an existing record in the fingerprint database 530. For example, various transmission parameters (e.g., the transmission power of the nodes, beam ID, and/or the channel) along with other criteria (e.g., whether the measurements were acquired during peak vs. non-peak time periods) may be used to determine the closeness metric. For a given combination of these parameters/criteria, multiple redundant fingerprints may be collectively processed to arrive at an average result and/or to remove outliers.

In some embodiments, the fingerprinting process may be performed over a plurality of iterations prior to the positioning phase. Additionally or alternatively, the fingerprinting process may be repeated or performed on-demand, e.g., based on changes detected in the environment (such as when a shelf is moved, new nodes are installed, etc.). Criteria that may be used to trigger an on-demand fingerprinting process may include, for example, a deviation of the fingerprinting measurements (e.g., the RSSI) collected by a node between consecutive fingerprinting sessions (or iterations of the fingerprinting process) that exceeds a first threshold (e.g., a threshold RSSI criterion). For example, upon determining that such a deviation exists for a group of nodes, the fingerprinting unit 522 may trigger on-demand fingerprinting by sending a command to each node in the group to repeat transmission of the positioning signals for measurement by the other nodes of the group.

In some implementations, the fingerprinting unit 522 may use additional thresholds corresponding to the number of nodes or relative locations of the nodes in the group. For example, the fingerprinting unit 522 in the above example may send the command to trigger on-demand fingerprinting only if a number of the listening/receiving (Rx) nodes in the group exceeds a threshold number and all the nodes in the group are co-located within an area or region of the environment (e.g., each node in the group is within a threshold distance of the other nodes in the group). Thus, when the number of the Rx nodes within a certain threshold region each exceeds the threshold number, it may be inferred that the set of measurements collected by these nodes are aberrant and that additional fingerprinting measurements are required.

In some cases, the corresponding set of transmit nodes (which produced the positioning signals for which the deviation in measurements exceeded the first threshold, e.g., threshold RSSI criterion) may be reported to the server 500 or an ERP system coupled thereto as "aberrant nodes." Additionally, a user (e.g., a store employee) may manually report to the ERP system and/or the server 500 any potential displacement of a group of nodes (which in turn would become aberrant nodes). Any deviation in the previously estimated or known locations of the infrastructure nodes 540, e.g., as determined based on RF measurements, camera/visual measurements, and/or motion sensor measurements, may be reported to the server 500 (or fingerprinting unit 522 thereof). The fingerprinting unit 522 of the server 500 may then trigger the fingerprinting process for the group of aberrant nodes.

As described above, the positioning unit 524 may use the fingerprint database 530 along with positioning measurements received from the target device 550 to determine a position of the target device 550 within the environment. It is assumed for purposes of this disclosure that the positioning measurements are collected and reported to the server 500 by the target device 550 based on signal transmissions received on the downlink from one or more nodes of the ESL infrastructure in a vicinity of the target device within the environment. However, in other implementations, the target device may transmit a beacon signal, which is received and measured by several infrastructure nodes in the vicinity of the target device on the uplink, and the positioning measurements may then be relayed by the nodes to the server 500.

A "vicinity" of the target device in this context may include, for example, a certain radius or area surrounding the target device's current position in which other devices (e.g., one or more ESL infrastructure nodes) within the environment may be located. In some implementations, the size of the radius or surrounding area may be predefined. Alternatively, the size of area may vary depending on the wireless signaling capabilities or particular wireless technology supported by the target device. For example, devices in the "vicinity" of the target device may be limited to those located within a wireless signaling range of the target device and thus, sufficiently close enough to exchange wireless signals with the target device.

In some embodiments, the positioning unit 524 may determine the position of the target device by first identifying a subset of infrastructure nodes associated with measurements along with the subset of fingerprints associated with the identified infrastructure nodes. In identifying the subset of fingerprints, the positioning unit 524 may take into account whether any transmissions were overlapping (in both time and frequency), the transmission (Tx) powers, beam IDs, etc.

The positioning unit 524 may compute a minimum closeness metric, where "closeness" in this context may refer to how similar or dissimilar the measurements are between the target device and the infrastructure nodes, e.g., using Equation (1):

$$n_{min} = \arg\min_{n \in N} \sum\nolimits_{m \neq n, m \in N} (M_{t,m} - M_{n,m,f})^2, \tag{1}$$

where N is the subset of infra devices (from step 1), $M_{t,m}$ is the measurement recorded between the target device and the $m^{th}$ infrastructure node, and $M_{n,m,f}$ is a measurement that was fingerprinted between the $n^{th}$ and $m^{th}$ infrastructure nodes under the $f^{th}$ scenario (peak vs non-peak for instance). The location of the most similar infrastructure node ($n_{min}$) may then be used as the position of the target device.

As an alternative to computing the closeness metric using Equation (1) above, a relative weight of each of the infrastructure nodes may be computed. These weights may then be used to estimate the position of the target device, e.g., using a weighted centroid approach in which the position of the target device 550 may be based on the weighted average of anchor node locations, where the weights are a function of the RSSI values associated with such nodes. Such anchor nodes may correspond to ESL infrastructure nodes for which the corresponding RSSI values are determined to be the strongest, or at least stronger than, the signal strengths associated with neighboring nodes.

For example, a position estimate ($\hat{P}$) for the target device 550 using this alternative approach may be determined using Equation (2):

$$\hat{P} = \frac{\sum_{n \in N} w_n \cdot P_n}{\sum_{n \in N} w_n}, \qquad (2)$$

where $P_n$ is the location of the $n^{th}$ infra device, and the weights $w_k$ may be a function of a similarity metric computed using Equation (3):

$$w_n = \frac{1}{\sum_{m \neq n, m \in N} (M_{t,m} - M_{n,m,f})^2}, \qquad (3)$$

and/or a set of RSSI measurements of positioning signals exchanged between the target device 550 and one or more infrastructure nodes. The above set of weights may also be used to modify the subset N to yield another subset N' (e.g., by ignoring all nodes having a weight lesser than a threshold) and repeating the above-described steps for determining the position of the target device 550 based on a minimum closeness metric computed using Equation (1).

FIG. 7 is a flow chart of an example method 700 for fingerprinting using nodes of an ESL infrastructure deployed within an environment according to some embodiments of this disclosure. For discussion purposes, method 700 will be described using the ESL system 100 of FIG. 1B, as described above, and/or the server 500 of FIG. 5, as described above. However, the method 700 is not intended to be limited thereto. For example, method 700 including the operations in the blocks described below may be performed by the management server 122 of the ESL system 100 or by components of the server 500, as described above.

Method 700 begins at block 702, which includes receiving, via a wireless network from each node of a plurality of nodes of an ESL infrastructure deployed at known locations within an environment, fingerprinting measurements of positioning signals transmitted by other nodes of the ESL infrastructure. These fingerprint measurements may include for each ESL node a measurement of signal strengths from various sources in the environment, including signal strengths of reference signals transmitted by other ESL nodes. For example, the fingerprint measurement for ESL node 1 may include signal measurements (e.g., RSSI values for reference signals) from ESL node 2 and ESL node 3; the fingerprint measurement for ESL node 2 may include signal measurements from ESL node 1, ESL node 3, and ESL node 4; the fingerprint measurement for ESL node 3 may include signal measurements from ESL node 1, ESL node 2, and ESL node 4; and the fingerprint measurement for ESL node 4 may include signal measurements from ESL node 3. Each of ESL node 1, ESL node 2, ESL node 3, and ESL node 4 may have known locations within the environment. The fingerprints may also be associated with certain times of the day.

Method 700 then proceeds to block 704, which includes storing, within a fingerprint database (e.g., fingerprint database 530 of FIG. 5) coupled to the server, the fingerprinting measurements received from each node of the ESL infrastructure at block 702 together with a known location of that node within the environment. The fingerprint measurements may be stored in a database local to the gateway or in a cloud remote from the gateway.

At block 706, positioning measurements corresponding to signal transmissions from one or more nodes of the ESL infrastructure in a vicinity of the target device within the environment are received via the wireless network.

At block 708, at least one node of the ESL infrastructure for which the corresponding fingerprinting measurements stored in the fingerprint database match the positioning measurements received from the target device is identified.

Method 700 then proceeds to block 710, which includes determining a position of the target device within the environment based on the known location of the at least one node identified at block 708.

In one or more aspects, techniques for supporting ESL systems may include additional aspects, such as any single aspect or any combination of aspects described below or in connection with one or more other processes or devices described elsewhere herein.

In a first aspect, a method comprises: receiving, from a target device by a server managing electronic shelf label (ESL) nodes, signal measurements of at least a first subset of ESL nodes in a vicinity of the target device; identifying, by the server, at least one ESL node of the ESL nodes which satisfy a criterion based on the signal measurements; and determining, by the server, a position of the target device based on a subset of locations including the locations associated with the at least one ESL node.

In a second aspect, in combination with the first aspect, the method further comprises: receiving, by the server from the ESL nodes, fingerprinting measurements of positioning signals received by the ESL nodes that were transmitted by others of the ESL nodes; and storing, within a fingerprint database accessible by the server, the fingerprinting measurements associated with locations of the ESL nodes.

In a third aspect, in combination with one or more of the first aspect or the second aspect, the fingerprinting measurements include first fingerprinting measurements received during a first time period and second fingerprinting measurements received during a second time period.

In a fourth aspect, in combination with one or more of the first aspect through the third aspect, the signal measurements comprise first signal measurements that include received signal strength indicators (RSSIs) of the positioning signals.

In a fifth aspect, in combination with one or more of the first aspect through the fourth aspect, the method further comprises sending, by the server to a first set of the ESL nodes, a first command to transmit the positioning signals according to one or more transmission parameters, wherein the one or more transmission parameters include a transmission power, a time slot, a beam identifier (ID), and a channel.

In a sixth aspect, in combination with one or more of the first aspect through the fifth aspect, the method further comprises: determining, by the server, that the RSSIs of the first signal measurements fails to meet a threshold RSSI criterion; and sending, by the server to each node in the first set, a second command to repeat transmission of the positioning signals for measurement by the other nodes of the first set.

In a seventh aspect, in combination with one or more of the first aspect through the sixth aspect, the second command is sent only if a number of the nodes in the first set exceeds a threshold number and each node in the first set is within a threshold distance of other nodes in the first set.

In an eighth aspect, in combination with one or more of the first aspect through the seventh aspect, the method further comprises: identifying, by the server, a first node which has a known first location; selecting, by the server from among the ESL nodes, one or more second nodes located within a threshold distance of the known first location of the first node; sending, by the server to the first node, a first command to transmit a first set of positioning signals for measurement by each of the one or more second nodes; and sending, by the server to each of the one or more second nodes, a second command to measure the first set of positioning signals transmitted by the first node.

In a ninth aspect, in combination with one or more of the first aspect through the eighth aspect, the first command instructs the first node to transmit the first set of positioning signals according to a first set of transmission parameters, and the method further comprises: receiving, by the server from each of the one or more second nodes, fingerprinting measurements of the first set of positioning signals transmitted by the first node.

In a tenth aspect, in combination with one or more of the first aspect through the ninth aspect, the method further comprises sending, by the server to a third node of ESL nodes having a known third location, a third command to transmit a second set of positioning signals according to a second set of transmission parameters such that the second set of positioning signals causes interference with the first set of positioning signals transmitted by the first node.

In an eleventh aspect, an apparatus includes a memory storing processor-readable code and at least one processor coupled to the memory, wherein the at least one processor is configured to execute the processor-readable code to cause the at least one processor to perform operations comprising: receiving, from a target device, signal measurements of at least a first subset of electronic shelf label (ESL) nodes in a vicinity of the target device; identifying at least one ESL node of the ESL nodes which satisfy a criterion based on the signal measurements; and determining a position of the target device based on a subset of locations including the locations associated with the at least one ESL node.

In a twelfth aspect, in combination with the eleventh aspect, the operations further comprise: receiving, from the ESL nodes, fingerprinting measurements of positioning signals received by the ESL nodes that were transmitted by others of the ESL nodes; and storing, within a fingerprint database, the fingerprinting measurements associated with locations of the ESL nodes.

In a thirteenth aspect, in combination with one or more of the eleventh aspect or the twelfth aspect, the fingerprinting measurements include first fingerprinting measurements received during a first time period and second fingerprinting measurements received during a second time period.

In a fourteenth aspect, in combination with one or more of the eleventh aspect through the thirteenth aspect, the signal measurements comprise first signal measurements that include received signal strength indicators (RSSIs) of the positioning signals.

In a fifteenth aspect, in combination with one or more of the eleventh aspect through the fourteenth aspect, the operations further comprise sending, to a first set of the ESL nodes, a first command to transmit the positioning signals according to one or more transmission parameters, and the one or more transmission parameters include a transmission power, a time slot, a beam identifier (ID), and a channel.

In a sixteenth aspect, in combination with one or more of the eleventh aspect through the fifteenth aspect, the operations further comprise: determining that the RSSIs of the first signal measurements fails to meet a threshold RSSI criterion; and sending, to each node in the first set, a second command to repeat transmission of the positioning signals for measurement by the other nodes of the first set.

In a seventeenth aspect, in combination with one or more of the eleventh aspect through the sixteenth aspect, the second command is sent only if a number of the nodes in the first set exceeds a threshold number and each node in the first set is within a threshold distance of other nodes in the first set.

In an eighteenth aspect, in combination with one or more of the eleventh aspect through the seventeenth aspect, the operations further comprise: identifying a first node which has a known first location; selecting, from among the ESL nodes, one or more second nodes located within a threshold distance of the known first location of the first node; sending, to the first node, a first command to transmit a first set of positioning signals for measurement by each of the one or more second nodes; and sending, to each of the one or more second nodes, a second command to measure the first set of positioning signals transmitted by the first node.

In a nineteenth aspect, in combination with one or more of the eleventh aspect through the eighteenth aspect, the first command instructs the first node to transmit the first set of positioning signals according to a first set of transmission parameters, and the operations further comprise: receiving, from each of the one or more second nodes, fingerprinting measurements of the first set of positioning signals transmitted by the first node.

In a twentieth aspect, in combination with one or more of the eleventh aspect through the nineteenth aspect, the operations further comprise: sending, to a third node of ESL nodes having a known third location, a third command to transmit a second set of positioning signals according to a second set of transmission parameters such that the second set of positioning signals causes interference with the first set of positioning signals transmitted by the first node.

In a twenty-first aspect, a non-transitory computer-readable medium stores instructions that, when executed by a processor, cause the processor to perform operations comprising: receiving, from a target device, signal measurements of at least a first subset of electronic shelf label (ESL) nodes in a vicinity of the target device; identifying at least one ESL node of the ESL nodes which satisfy a criterion based on the signal measurements; and determining a position of the target device based on a subset of locations including the locations associated with the at least one ESL node.

In a twenty-second aspect, in combination with the twenty-first aspect, the operations further comprise: receiving, from the ESL nodes, fingerprinting measurements of positioning signals received by the ESL nodes that were transmitted by others of the ESL nodes; and storing, within a fingerprint database, the fingerprinting measurements associated with locations of the ESL nodes.

In a twenty-third aspect, in combination with one or more of the twenty-first aspect or the twenty-second aspect, the fingerprinting measurements include first fingerprinting measurements received during a first time period and second fingerprinting measurements received during a second time period.

In a twenty-fourth aspect, in combination with one or more of the twenty-first aspect through the twenty-third aspect, the signal measurements comprise first signal measurements that include received signal strength indicators (RSSIs) of the positioning signals.

In a twenty-fifth aspect, in combination with one or more of the twenty-first aspect through the twenty-fourth aspect, the operations further comprise sending, to a first set of the ESL nodes, a first command to transmit the positioning signals according to one or more transmission parameters, and the one or more transmission parameters include a transmission power, a time slot, a beam identifier (ID), and a channel.

In a twenty-sixth aspect, an electronic shelf label (ESL) system comprises ESL nodes and a server comprising: a memory; and at least one processor coupled to the memory and configured to perform operations comprising: receiving, from a target device, signal measurements of at least a first subset of electronic shelf label (ESL) nodes in a vicinity of the target device; identifying at least one ESL node of the ESL nodes which satisfy a criterion based on the signal measurements; and determining a position of the target device based on a subset of locations including the locations associated with the at least one ESL node.

In a twenty-seventh aspect, in combination with the twenty-sixth aspect, the operations further comprise: receiving, from the ESL nodes, fingerprinting measurements of positioning signals received by the ESL nodes that were transmitted by others of the ESL nodes; and storing, within a fingerprint database, the fingerprinting measurements associated with locations of the ESL nodes.

In a twenty-eighth aspect, in combination with one or more of the twenty-sixth aspect or the twenty-seventh aspect, the fingerprinting measurements include first fingerprinting measurements received during a first time period and second fingerprinting measurements received during a second time period.

In a twenty-ninth aspect, in combination with one or more of the twenty-sixth aspect through the twenty-eighth aspect, the signal measurements comprise first signal measurements that include received signal strength indicators (RSSIs) of the positioning signals.

In a thirtieth aspect, in combination with one or more of the twenty-sixth aspect through the twenty-ninth aspect, the operations further comprise sending, to a first set of the ESL nodes, a first command to transmit the positioning signals according to one or more transmission parameters, and the one or more transmission parameters include a transmission power, a time slot, a beam identifier (ID), and a channel.

Components, the functional blocks, and the modules described herein with respect to the figures described above include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein but are to be accorded the widest scope consistent with this disclosure, the principles and the novel features disclosed herein.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method comprising:
receiving, by a server from at least a first subset of electronic shelf label (ESL) nodes, fingerprinting measurements of positioning signals received by the ESL nodes that were transmitted by others of the ESL nodes;
receiving, from a target device by the server, signal measurements of at least the first subset of ESL nodes in a vicinity of the target device;
identifying, by the server, at least one ESL node of the ESL nodes which satisfy a criterion based on the signal measurements; and
determining, by the server, a position of the target device based on a subset of locations including the locations associated with the at least one ESL node.

2. The method of claim 1, further comprising
storing, within a fingerprint database accessible by the server, the fingerprinting measurements associated with locations of the ESL nodes.

3. The method of claim 2, wherein the fingerprinting measurements include first fingerprinting measurements received during a first time period and second fingerprinting measurements received during a second time period.

4. The method of claim 2, wherein the signal measurements comprise first signal measurements that include received signal strength indicators (RSSIs) of the positioning signals.

5. The method of claim 4, further comprising sending, by the server to a first set of the ESL nodes, a first command to transmit the positioning signals according to one or more transmission parameters, wherein the one or more transmission parameters include a transmission power, a time slot, a beam identifier (ID), and a channel.

6. The method of claim 4, further comprising:
determining, by the server, that the RSSIs of the first signal measurements fails to meet a threshold RSSI criterion; and
sending, by the server to each node in the first set, a second command to repeat transmission of the positioning signals for measurement by the other nodes of the first set.

7. The method of claim 6, wherein the second command is sent only if a number of the nodes in the first set exceeds a threshold number and each node in the first set is within a threshold distance of other nodes in the first set.

8. The method of claim 1, further comprising:
identifying, by the server, a first node which has a known first location;
selecting, by the server from among the ESL nodes, one or more second nodes located within a threshold distance of the known first location of the first node;
sending, by the server to the first node, a first command to transmit a first set of positioning signals for measurement by each of the one or more second nodes; and
sending, by the server to each of the one or more second nodes, a second command to measure the first set of positioning signals transmitted by the first node.

9. The method of claim 8, wherein the first command instructs the first node to transmit the first set of positioning signals according to a first set of transmission parameters, and wherein the method further comprises:

receiving, by the server from each of the one or more second nodes, fingerprinting measurements of the first set of positioning signals transmitted by the first node.

10. The method of claim 9, further comprising:

sending, by the server to a third node of ESL nodes having a known third location, a third command to transmit a second set of positioning signals according to a second set of transmission parameters such that the second set of positioning signals causes interference with the first set of positioning signals transmitted by the first node.

11. An apparatus comprising:

a memory storing processor-readable code; and at least one processor coupled to the memory, the at least one processor configured to execute the processor-readable code to cause the at least one processor to perform operations comprising:

receiving, from at least a first subset of electronic shelf label (ESL) nodes, fingerprinting measurements of positioning signals received by the ESL nodes that were transmitted by others of the ESL nodes;

receiving, from a target device, signal measurements of at least the first subset of ESL nodes in a vicinity of the target device;

identifying at least one ESL node of the ESL nodes which satisfies a criterion based on the signal measurements; and determining a position of the target device based on a subset of locations including the locations associated with the at least one ESL node.

12. The apparatus of claim 11, wherein the operations further comprise:

storing, within a fingerprint database, the fingerprinting measurements associated with locations of the ESL nodes.

13. The apparatus of claim 12, wherein the fingerprinting measurements include first fingerprinting measurements received during a first time period and second fingerprinting measurements received during a second time period.

14. The apparatus of claim 12, wherein the signal measurements comprise first signal measurements that include received signal strength indicators (RSSIs) of the positioning signals.

15. The apparatus of claim 14, wherein the operations further comprise sending, to a first set of the ESL nodes, a first command to transmit the positioning signals according to one or more transmission parameters, and wherein the one or more transmission parameters include a transmission power, a time slot, a beam identifier (ID), and a channel.

16. The apparatus of claim 14, wherein the operations further comprise:

determining that the RSSIs of the first signal measurements fails to meet a threshold RSSI criterion; and sending, to each node in the first set, a second command to repeat transmission of the positioning signals for measurement by the other nodes of the first set.

17. The apparatus of claim 16, wherein the second command is sent only if a number of the nodes in the first set exceeds a threshold number and each node in the first set is within a threshold distance of other nodes in the first set.

18. The apparatus of claim 11, wherein the operations further comprise:

identifying a first node which has a known first location;

selecting, from among the ESL nodes, one or more second nodes located within a threshold distance of the known first location of the first node;

sending, to the first node, a first command to transmit a first set of positioning signals for measurement by each of the one or more second nodes; and sending, to each of the one or more second nodes, a second command to measure the first set of positioning signals transmitted by the first node.

19. The apparatus of claim 18, wherein the first command instructs the first node to transmit the first set of positioning signals according to a first set of transmission parameters, and wherein the operations further comprise:

receiving, from each of the one or more second nodes, fingerprinting measurements of the first set of positioning signals transmitted by the first node.

20. The apparatus of claim 19, wherein the operations further comprise:

sending, to a third node of ESL nodes having a known third location, a third command to transmit a second set of positioning signals according to a second set of transmission parameters such that the second set of positioning signals causes interference with the first set of positioning signals transmitted by the first node.

21. A non-transitory computer-readable medium storing instructions that, when executed by a processor, cause the processor to perform operations comprising:

receiving, from at least a first subset of electronic shelf label (ESL) nodes, fingerprinting measurements of positioning signals received by the ESL nodes that were transmitted by others of the ESL nodes;

receiving, from a target device, signal measurements of at least the first subset of ESL nodes in a vicinity of the target device;

identifying at least one ESL node of the ESL nodes which satisfy a criterion based on the signal measurements; and determining a position of the target device based on a subset of locations including the locations associated with the at least one ESL node.

22. The non-transitory computer-readable medium of claim 21, wherein the operations further comprise storing, within a fingerprint database, the fingerprinting measurements associated with locations of the ESL nodes.

23. The non-transitory computer-readable medium of claim 22, wherein the fingerprinting measurements include first fingerprinting measurements received during a first time period and second fingerprinting measurements received during a second time period.

24. The non-transitory computer-readable medium of claim 22, wherein the signal measurements comprise first signal measurements that include received signal strength indicators (RSSIs) of the positioning signals.

25. The non-transitory computer-readable medium of claim 24, wherein the operations further comprise sending, to a first set of the ESL nodes, a first command to transmit the positioning signals according to one or more transmission parameters, and wherein the one or more transmission parameters include a transmission power, a time slot, a beam identifier (ID), and a channel.

26. An electronic shelf label (ESL) system comprising:

ESL nodes; and a server comprising a memory and at least one processor coupled to the memory, wherein the at least one processor is configured to perform operations comprising:

receiving, by the server from at least a first subset of ESL nodes, fingerprinting measurements of positioning signals received by the ESL nodes that were transmitted by others of the ESL nodes;

receiving, from a target device by the server, signal measurements of at least the first subset of the ESL nodes in a vicinity of the target device;

identifying, by the server, at least one ESL node of the ESL nodes which satisfy a criterion based on the signal measurements; and determining, by the server, a position of the target device based on a subset of locations including the locations associated with the at least one ESL node.

27. The ESL system of claim 26, wherein the operations further comprise storing, by the server within a fingerprint database, the fingerprinting measurements associated with locations of the ESL nodes.

28. The ESL system of claim 27, wherein the fingerprinting measurements include first fingerprinting measurements received during a first time period and second fingerprinting measurements received during a second time period.

29. The ESL system of claim 27, wherein the signal measurements comprise first signal measurements that include received signal strength indicators (RSSIs) of the positioning signals.

30. The ESL system of claim 29, wherein the operations further comprise sending, by the server to a first set of the ESL nodes, a first command to transmit the positioning signals according to one or more transmission parameters, and wherein the one or more transmission parameters include a transmission power, a time slot, a beam identifier (ID), and a channel.

* * * * *